(12) United States Patent
Belenki

(10) Patent No.: US 7,890,568 B2
(45) Date of Patent: Feb. 15, 2011

(54) SERVICE-TO-DEVICE MAPPING FOR SMART ITEMS USING A GENETIC ALGORITHM

(75) Inventor: Mikhail Belenki, Karlsruhe (DE)

(73) Assignee: SAP AG, Walldorf (DE)

( * ) Notice: Subject to any disclaimer, the term of this patent is extended or adjusted under 35 U.S.C. 154(b) by 1242 days.

(21) Appl. No.: 11/413,230

(22) Filed: Apr. 28, 2006

(65) Prior Publication Data

US 2007/0251998 A1 Nov. 1, 2007

(51) Int. Cl.
*G06F 15/16* (2006.01)

(52) U.S. Cl. .................. 709/200; 709/223; 709/224; 709/225; 709/226

(58) Field of Classification Search ......... 703/223–226, 703/200; 709/223–226, 200
See application file for complete search history.

(56) References Cited

U.S. PATENT DOCUMENTS

| | | | |
|---|---|---|---|
| 6,016,499 A | 1/2000 | Ferguson | |
| 6,138,162 A | 10/2000 | Pistriotto et al. | |
| 6,189,038 B1 | 2/2001 | Thompson et al. | |
| 6,226,788 B1 | 5/2001 | Schoening et al. | |
| 6,292,856 B1 | 9/2001 | Marcotte | |
| 6,363,411 B1 | 3/2002 | Dugan et al. | |
| 6,378,128 B1 * | 4/2002 | Edelstein et al. | 717/174 |
| 6,460,082 B1 * | 10/2002 | Lumelsky et al. | 709/226 |
| 6,480,977 B1 | 11/2002 | Apisdorf et al. | |
| 6,785,707 B2 | 8/2004 | Teeple | |
| 6,816,862 B2 | 11/2004 | Mulgund et al. | |
| 6,832,373 B2 | 12/2004 | O'Neill | |
| 6,847,974 B2 | 1/2005 | Wachtel | |
| 6,859,831 B1 | 2/2005 | Gelvin et al. | |
| 6,891,823 B1 | 5/2005 | Schwartz et al. | |

(Continued)

FOREIGN PATENT DOCUMENTS

EP 0697654 A1 2/1996

(Continued)

OTHER PUBLICATIONS

Krause, et al.,"Near optimal Sensor Placements: Maximizing Information while Minimizing Communication Cost", IPSN'06, Apr. 19-21, 2006, 9 pages.

(Continued)

*Primary Examiner*—William C Vaughn, Jr.
*Assistant Examiner*—Mohamed Ibrahim
(74) *Attorney, Agent, or Firm*—Brake Hughes Bellermann LLP

(57) ABSTRACT

Systems and methods allow service-to-device mapping using genetic algorithm logic by which services are mapped onto best-suited smart items selected from a plurality of smart items of a sensor network. As part of the mapping, and/or subsequent thereto, a deployment of the service(s) onto the smart items is initiated. A sorted repair structure indicating an ordering of services in accordance with a hierarchy of atomic services and composite services based on a composition of services for one or more devices of a sensor network is determined. One or more derived generation structures are determined based on genetic algorithm logic that is operable on the sorted repair structure. A service is mapped onto at least one device of the sensor network, based on one of the derived generation structures. As a result, users may achieve a desired result in a fast, convenient, and reliable manner, even when executing the deployment remotely or automatically.

16 Claims, 7 Drawing Sheets

U.S. PATENT DOCUMENTS

| | | |
|---|---|---|
| 6,980,993 B2 | 12/2005 | Horvitz et al. |
| 6,990,660 B2 | 1/2006 | Moshir et al. |
| 7,072,960 B2 | 7/2006 | Graupner et al. |
| 7,075,960 B2 | 7/2006 | Kohara et al. |
| 7,099,582 B2 | 8/2006 | Belhadj-Yahya et al. |
| 7,099,946 B2 | 8/2006 | Lennon et al. |
| 7,114,146 B2 | 9/2006 | Zhang et al. |
| 7,130,773 B1 | 10/2006 | Wong |
| 7,152,019 B2 | 12/2006 | Tarantola et al. |
| 7,171,471 B1 | 1/2007 | Nair |
| 7,206,289 B2 | 4/2007 | Hamada |
| 7,237,243 B2 | 6/2007 | Sutton et al. |
| 7,286,158 B1 | 10/2007 | Griebenow |
| 7,304,976 B2 | 12/2007 | Mao et al. |
| 7,313,467 B2 | 12/2007 | Breed et al. |
| 7,557,707 B2 | 7/2009 | Kumar et al. |
| 2002/0007422 A1 | 1/2002 | Bennett |
| 2002/0100036 A1 | 7/2002 | Moshir et al. |
| 2002/0161751 A1 | 10/2002 | Mulgund et al. |
| 2002/0184103 A1* | 12/2002 | Shah et al. .......... 705/26 |
| 2003/0078946 A1 | 4/2003 | Costello et al. |
| 2003/0097443 A1 | 5/2003 | Gillett et al. |
| 2003/0217186 A1 | 11/2003 | Bushey |
| 2004/0121792 A1 | 6/2004 | Allen et al. |
| 2004/0166807 A1 | 8/2004 | Vesikivi et al. |
| 2004/0181541 A1 | 9/2004 | Groenendaal et al. |
| 2004/0220910 A1* | 11/2004 | Zang et al. .......... 707/3 |
| 2004/0250113 A1 | 12/2004 | Beck |
| 2005/0047545 A1 | 3/2005 | Benedetti |
| 2005/0060365 A1 | 3/2005 | Robinson et al. |
| 2005/0198228 A1 | 9/2005 | Bajwa et al. |
| 2005/0228763 A1 | 10/2005 | Lewis et al. |
| 2005/0235058 A1 | 10/2005 | Rackus et al. |
| 2006/0022801 A1 | 2/2006 | Husak et al. |
| 2006/0029054 A1 | 2/2006 | Breh et al. |
| 2006/0052882 A1 | 3/2006 | Kubach et al. |
| 2006/0074912 A1 | 4/2006 | Borthakur et al. |
| 2006/0085798 A1 | 4/2006 | Bendiksen et al. |
| 2006/0161909 A1* | 7/2006 | Pandey et al. .......... 717/168 |
| 2006/0206582 A1 | 9/2006 | Finn |
| 2006/0212453 A1 | 9/2006 | Eshel et al. |
| 2006/0235976 A1 | 10/2006 | Chen et al. |
| 2006/0265661 A1* | 11/2006 | Ball .......... 715/734 |
| 2006/0277079 A1 | 12/2006 | Gilligan et al. |
| 2007/0032244 A1 | 2/2007 | Counts et al. |
| 2007/0112574 A1 | 5/2007 | Greene |
| 2007/0118496 A1 | 5/2007 | Bornhoevd et al. |
| 2007/0118549 A1 | 5/2007 | Bornhoevd et al. |
| 2007/0118560 A1* | 5/2007 | Bornhoevd et al. ...... 707/104.1 |
| 2007/0130208 A1 | 6/2007 | Bornhoevd et al. |
| 2007/0168925 A1 | 7/2007 | Bornhoevd et al. |
| 2007/0233881 A1 | 10/2007 | Nochta et al. |
| 2007/0276619 A1 | 11/2007 | Sugahara et al. |
| 2007/0282746 A1 | 12/2007 | Anke et al. |
| 2007/0282988 A1 | 12/2007 | Bornhoevd et al. |
| 2007/0283001 A1 | 12/2007 | Spiess et al. |
| 2007/0283002 A1 | 12/2007 | Bornhoevd et al. |
| 2008/0010284 A1 | 1/2008 | Beck |
| 2008/0033785 A1 | 2/2008 | Anke |
| 2008/0306798 A1 | 12/2008 | Anke et al. |
| 2009/0097397 A1 | 4/2009 | Moreira |

FOREIGN PATENT DOCUMENTS

| | | |
|---|---|---|
| EP | 0810755 A3 | 3/1999 |
| EP | 1372073 A2 | 12/2003 |
| EP | 1788480 A2 | 5/2007 |
| EP | 1863223 A1 | 12/2007 |
| EP | 1892656 A1 | 2/2008 |
| WO | 2005/106666 A1 | 11/2005 |

OTHER PUBLICATIONS

Response to Examination Report for European Application No. 07008409.0, filed Nov. 27, 2007, 13 pages.
Response to Examination Report for European Application No. 07008409.0, filed May 25, 2010, 17 pages.
Supplemental Examination Report for European Application No. 07008409.0, mailed Jun. 30, 2008, 3 pages.
Supplemental Examination Report for European Application No. 07008409.0, mailed Mar. 5, 2010, 4 pages.
Response to Examination Report for European Application No. 07008409.0, filed Sep. 8, 2008, 17 pages.
Non-Final Office Action for U.S. Appl. No. 11/444,119, mailed Mar. 30, 2010, 45 pages.
Final Office Action for U.S. Appl. No. 11/396,299, mailed Jan. 28, 2010, 54 pages.
Non-Final Office Action for U.S. Appl. No. 11/283,618, mailed on May 24, 2010, 42 pages.
Non-Final Office Action for U.S. Appl. No. 11/871,616, mailed Mar. 9, 2010, 46 pages.
Notice of Allowance for U.S. Appl. No. 11/479,284, mailed on May 13, 2010, 30 pages.
Non-Final Office Action for U.S. Appl. No. 11/810,357, mailed on Apr. 26, 2010, 61 pages.
Speiss, et al, "Collaborative Business Items", Sixth Framework Programme, Information Society Technology Technical Report, CoBIsDeliverable D101, 2005, 59 pages.
Speiss, "Collaborative Business Items: Decomposing Business Process Services for Execution of Business Logic on the Item", European Workshop on Wireless Sensor Networks, Istanbul, 2005, 3 pages.
Speiss, et al, "going beyond auto-id—a service-oriented smart items infrastructure", JEIM, Mar. 2007, 9 pages.
Strohbach, et al, "Cooperative Artefacts:Assessing Real World Situations with Embedded Technology", In Proceedings of the 6th International Conference on Ubiquitous Computing, Nottingham, UK, 2004, pp. 250-267.
Sun Microsystems, "Connected Limited Device Configuration", Java™ 2 Platform, Micro Edition (J2ME™) Specification Version 1.1, Mar. 2003, 60 pages.
Sun Microsystems, "Jini Architecture Specification", Version 1.2, Dec. 2001, 26 pages.
Sun Microsystems, "Sun SPOT System: Turning Vision into Reality", Sun SPOT System Project description, 2005, 4 pages.
Talwar, et al, "Approaches for Service Deployment", IEEE Internet Computing, vol. 9(2), Mar.-Apr. 2005, pp. 70-80.
"Universal Plug and Play (UPnP)", Wikepedia, the free encyclopedia, Retrieved on Dec. 20, 2005, from http://en.wikipedia.org/wiki/Universal_Plug_and_Play, 6 pages.
"UPnP Device Architecture 1.0", UPnP Forum, 1999, 80 pages.
van de Loo, et al, "Enterprise Services Design Guide", Version 1.0, SAP, 2005, pp. 1-40.
van der Aalst, "Modelling and analysing workflow using a Petri-net based approach", Proceedings of the 2nd Workshop on Computer-Supported Cooperative Work, Petri nets and related formalisms, 1994, pp. 31-50.
Veizades, et al, "Service Location Protocol. Request for Comments RFC 2165", Network Working Group, Jun. 1997, 72 pages.
VeriSign, "The EPCglobal Network: Enhancing the Supply Chain", VeriSign Technical Report, 2004, 8 pages.
Villanueva, et al, "Context-Aware QoS Provision for Mobile Ad-hoc Network—based Ambient Intelligent Environments", Header Background Image, 12(3), 2006, 13 pages.
Waldo, "The Jini architecture for network-centric computing", Communications of the ACM archive, vol. 42, Issue 7, Jul. 1999, pp. 76-82.
Wander, et al, "Energy Analysis of Public-Key Cryptography for Wireless Sensor Networks", UC Santa Cruz, Sun Microsystems Laboratories, 2005, 5 pages.
Wang, et al, "Timing Analysis of Real-Time Networked RFID Systems", Cambridge Auto-ID Lab, Cambridge UK, 2004, 4 pages.

Wameke, et al, "Smart dust: Communicating with a cubic-millimeter computer", Computer, 34(1), 2001, pp. 44-51.
Weiser, "The computer for the 21st century", ACM Sigmobile Mobile Computing and Communications Review archive, vol. 3, Issue 3, Jul. 1999, 6 pages.
"Java Native Interface (JNI)", Wikepedia, the free encyclopedia, Retrieved on Dec. 20, 2005, from http://en.wikipedia.org/wiki/Jini, 6 pages.
"Service Location Protocol (SLP)", Wikepedia, the free encyclopedia, Retrieved on Dec. 20, 2005, from http://en.wikipedia.org/wiki/Service_Location_Protocol, 1 page.
Woods, "Enterprise Services Architecture", Galileo Press, 2003, 10 pages.
Non-Final Office Action for U.S. Appl. No. 11/496,641, mailed Jul. 29, 2010, 55 pages.
Final Office Action for U.S. Appl. No. 11/444,119, mailed Aug. 24, 2010, 28 pages.
Advisory Action for U.S. Appl. No. 11/284,195, mailed Oct. 9, 2008, 4 pages.
Non-Final Office Action for U.S. Appl. No. 11/479,284, mailed Oct. 30, 2009, 19 pages.
Final Office Action for U.S. Appl. No. 11/284,195, mailed Jun. 25, 2008, 31 pages.
Non-Final Office Action for U.S. Appl. No. 11/284,195, mailed Nov. 1, 2007, 17 pages.
Non-Final Office Action for U.S. Appl. No. 11/433,621, mailed Aug. 17, 2010, 43 pages.
Final Office Action for U.S. Appl. No. 11/479,284, mailed Jun. 11, 2009, 4 pages.
Non-Final Office Action for U.S. Appl. No. 11/479,284, mailed Aug. 11, 2010, 19 pages.
Non-Final Office Action for U.S. Appl. No. 11/583,274, mailed Oct. 7, 2009, 22 pages.
Non-Final Office Action for U.S. Appl. No. 11/583,274, mailed Aug. 5, 2010, 21 pages.
Ardaiz, et al, "On Service Deployment in Ubiquitous Computing", Proceedings of the 2nd International Workshop on Ubiquitous Computing and Communications, Sep. 2001, 7 pages.
Arkin, et al, "Web Services Business Process Execution Language Version 2.0", Committee Draft, Sep. 2005, 81 pages.
Arkin, et al, "Web Service Choreography Interface (WSCI) Version 1.0", W3C Note, Aug. 2002, 84 pages.
Bohn, et al, "SIRENA—Service Infrastructure for Real-time Embedded Networked Devices: A service oriented framework for different domains", International Conference on Networking, International Conference on Systems and International Conference on Mobile Communications and Learning Technologies, 2006, 6 pages.
Box, et al, "Web Services Eventing (WS-Eventing)", Aug. 2004, 16 pages.
Crossbow, "Wireless Sensor Networks: Sensor and Data-Acquisition Boards", retrieved on Apr. 24, 2005 from http://www.xbow.com/Products/productsdetails.aspx?sid=63, 1 page.
Crossbow, "Stargate: X-Scale Processor Platform SPB 400", retrieved on Dec. 20, 2005 from http://www.xbow.com/Products/productsdetails.aspx?sid=63, 2 pages.
Clement, et al, "UDDI version 3.2, UDDI Spec Technical Committee Draft, OASIS, UDDI Spec TC", Oct. 2004, 420 pages.
Christensen, et al, "Web Services Description Language (WSDL) 1.1", W3C Note, Mar. 2001, 27 pages.
Chackrabarti, et al, "Securing the Pharmaceutical Supply Chain", Technical Report, Auto-ID Centre Institute for Manufacturing, University of Cambridge, Jun. 1, 2003, 19 pages.
California Software Laboratories, "White Paper: The JetSend Appliance Architecture", retrieved from http://www.calsoftlabs.com/whitepapers/jetsend-architecture.html, 2002, 28 pages.
Davenport, "Process Innovation: Reengineering work through information technology", Harvard Business School Press, 1993, 6 pages.
de Sales, et al, "Towards the UPnP-UP: Enabling User Profile to Support Customized Services in UPnP Networks", Proceedings of the 2008 The Second International Conference on Mobile Ubiquitous Computing, Systems, Services and Technologies, 2008, pp. 206-211.
Decker, et al, "CoBIs Platform Survey and State-of-the-Art Sensor Platforms", CoBIs Deliverable Report, Aug. 2005, 51 pages.

Deering, "Hinden. Internet Protocol, Version 6 (Ipv6) Specification. Request for Comments RFC 2460", Internet Engineering Task Force, 1998, 39 pages.
Geller, et al, "Web Services Eventing (WS-Eventing)", Aug. 2004, 38 pages.
Gudgin, et al, "SOAP Message Transmission Optimization Mechanism", Jan. 25, 2005, 15 pages.
Guttman, "Service Location Protocol", Version 2, Jun. 1999, 55 pages.
Haas, "Service Deployment in Programmable Networks", PhD Thesis, ETH Zurich, Switzerland, 2003, 253 pages.
Hammer, et al, "Reengineering the Corporation—A Manifesto for Business Revolution", Nicholas Brealey Publishing, May 1994, 14 pages.
Han, et al, "Sensor Network Software Update Management: A Survey", Journal of Network Management, 2005, 26 pages.
Intel Research, "An Introduction to Wireless Sensor Networks", Technical Report, 2004, 6 pages.
Karuppiah, et al, "Design and Implementation of Multihomed IPv6 Testbed Network for Research Community: The Malaysian IPv6 Network Operation Centre Experience", IWS2000, APAN Conference, Tsukuba, 2000, 6 pages.
Kim, et al, "A leader election algorithm in a distributed computing system", 5th IEEE Workshop on Future Trends of Distributed Computing Systems, 1995, 5 pages.
Kiselyov, "Functional XML parsing framework: SAX/DOM and SXML parsers with support for XML Namespaces and validation", 2001, 42 pages.
Lampe, et al, "A ubiquitous computing environment for aircraft maintenance", SAC '04: Proceedings of the 2004 ACM Symposium on Applied Computing, 2004, pp. 1586-1592.
Law, et al, "Assessing Security-Critical Energy-Efficient Sensor Networks", 2002, 10 pages.
Malpani, et al, "Leader election algorithms for mobile ad hoc networks", Proceedings of the 4th international Workshop on Discrete Algorithms and Methods for Mobile Computing and Communications, Aug. 11, 2000, pp. 96-103.
Nochta, et al, "Relocatable services and service classification scheme", Authorization Level: Public (PU) Version 1.0, Feb. 2005, 59 pages.
Nokia, "Nokia Intellisync Device Management", Overview for IT Managers, May 2007, 19 pages.
"OSGI Service Platform", Release 3, IOS Press, Mar. 2003, 602 pages.
Parikh, et al, "Security in Sensor Networks", CS 588: Cryptography, 2001, 28 pages.
Park, "Specification of the Bluetooth System: Wireless connections made easy", Covered Core Package version: 1.2, Nov. 2003, 1200 pages.
Passing, "Profiling, Monitoring and Tracing in SAP WebAS", SAP Library, Jun. 22, 2005, 9 pages.
Phillips, "Aqueduct: Robust and Efficient Code Propagation in Heterogeneous Wireless Sensor Networks", Master's Thesis submitted to the Graduate School of the University of Colorado, 2005, 61 pages.
Postel, "Internet Control Message Protocol", Protocol Specification. Request for Comments RFC 792, 1981, 21 pages.
Postel, "Internet Protocol", Protocol Specification, Request for Comments RFC 791, 1983, 51 pages.
Postel, "Transmission Control Protocol", Protocol Specification, Request for Comments RFC 793, 1981, 91 pages.
Postel, "User Datagram Protocol", Protocol Specification, Request for Comment, RFC 768, Information Sciences Institute, 1981, 3 pages.
Rebahi, et al, "Service Management Module (SMM)", 2004, 61 pages.
Rostad, et al, "Closing the Product Lifecycle Information Loops", 18th International Conference on Production Research, 2005, 5 pages.
SAP, "SAP NetWeaver: Providing the foundation to enable and manage change", retrieved on Nov. 10, 2005 from http://www.sap.com/solutions/netweaver/index.epx, 1 page.
SAP, "Security Guide for Mobile Engine 2.1 SP02", SAP Library—SAP Mobile Engine, Dec. 1, 2004, 13 pages.

SAX, "About SAX", retrieved on Jan. 6, 2006 from http://www.saxproject.org/, 1 page.
Scheer, "Aris-Business Process Modeling", Springer 3rd edition, 2000, 10 pages.
Schlimmer, et al, "Devices Profile for Web Services", May 2005, 39 pages.
Schlimmer, et al, "Web Services Dynamic Discovery (WS-Discovery)", Apr. 2005, 42 pages.
Schneider, et al, "Application and Scenarios of RFID technology", Seminar Datenschutzaspekte im Umfeld des Pervasive Computing, 2004, 29 pages.
Schneier, "Applied Cryptography", 2nd edition, John Wiley & Sons, Inc., 1996, 18 pages.
Foster, I. et al., "The Open Grid Services Architecture, Version 1.0", Informational Document, Global Frid Forum (Jan. 29, 2005), pp. 1-62.
Baker, M. et al., "Grids and Grid Technologies for wide-area Distributed Computing", Software—Practice & Experience (Sep. 27, 2002), pp. 1437-1466.
Mikic-Rakic, M et al., "Improving availability in large, distributed component-based systems via redeployment", LNCS, vol. 3798 (Nov. 3, 2005), 15 pgs.
Malek, S et al., "A decentralized redeployment algorithm for improving the availability of distributed systems", LNCS, vol. 3798 (Nov. 3, 2005), 13 pgs.
Hoareau, D et al., "Constraint-Based Deployment of Distributed Components in a Dynamic Network", LNCS, vol. 3894 (Mar. 16, 2006), pp. 450-464.
Bitkom, "RFID White Paper Technology, Systems and Applications", An Overview for companies seeking to use RFID technology to connect their IT systems directly to the "real" world, Dec. 2005, 50 pgs.
Mikic-Rakic, M et al., "A tailorable environment for assessing the quality of deployment architectures in highly distributed settings", Second International Working Conference on Component Deployment (2004), pp. 1-15.
Ploennigs, J et al., "A traffic model for networked devices in the building automation", In: Proceedings of the 5th IEEE International Workshop on Factory Communication Systems (WFCS 2004), Vienna, Austria, (2004), pp. 137-145.
Wu, Q et al., "Adaptive component allocation in scudware middleware for ubiquitous computing", LNCS, vol. 3824 (Dec. 6, 2005), pp. 1155-1164.
Wegdam, M et al., "Dynamic reconfiguration and load distribution in component middleware", PhD thesis, University of Twente, Enschede, (2003), pp. 1-257.
Colt, Charles et al., "Oracle Â® Collaboration Suite, Deployment Guide10g Release 1 (10.1.1) B14479-02", (Oct. 2005), pp. 1-230.
Malek, S et al., "A style-aware architectural middleware for resource-constrained,distributed systems", IEEE Transactions on Software Engineering, vol. 31, Issue 3 (Mar. 2005), pp. 256-272.
Lacour, S et al., "A Software Architecture for Automatic Deployment of CORBA Components Using Grid Technologies", Networking and Internet Architecture, DECOR04 (Nov. 24, 2004), pp. 187-192.
Kichkaylo, T et al., "Constrained Component Deployment in Wide-Area Networks Using AI Planning Techniques", Proceedings of the 17th International Symposium on Parallel and Distributed Processing 2003), pp. 1-10.
Akehurst, D H., et al., "Design Support for Distributed Systems: DSE4DS", Procedings of the 7th Cabernet Radicals Workshop (Oct. 2002), pp. 1-6.
Kichkaylo, T et al., "Optimal Resource-Aware Deployment Planning for Component-Based Distributed Applications", HPDC '04: Proceedings of the 13th IEEE International Symposium on High Performance Distributed Computing (HPDC '04), IEEE Computer Society (2004), pp. 150-159.
Wu, X et al., "Performance modeling from software components", ACM SIGSOFT Software Engineering Notes, vol. 29, Issue 1 (Jan. 2004), pp. 290-301.
Stewart, C et al., "Profile driven Component Placement for Cluster-based Online Services", IEEE Distributed Systems Online, vol. 5, No. 10, (Oct. 2004), p. 1-6.

Perkins, C. et al., "IP Mobility Support for IPv4", IETF Standard, Internet Engineering Task Force (Aug. 2002), pp. 1-100.
Anke, J. et al., "Early Data Processing in Smart Item Environments Using Mobile Services", Proceedings of the 12th IFAC Symposium on Information Control Problems in Manufacturing—INCOM, (May 19, 2006), pp. 823-828.
Carzaniga, Antonio et al., "Designing distributed applications with mobile code paradigms", In: Proceedings of the 19th International Conference on Software Engineering, Boston, Massachusetts, (1997), pp. 22-32.
Chandra, Bharat et al., "Resource management for scalable disconnected access to web services", WWW '01: Proceedings of the 10th International Conference on World Wide Web (May 5, 2001), pp. 245-256.
ETSI, "Selection procedures for the choice of radio transmission technologies of the UMTS", Universal Mobile Telecommunications System 30.03 version 3.2.0 (Apr. 1998), pp. 1-84.
Fredriksson, Johan et al., "Calculating Resource Trade-offs when Mapping Component Services to Real-Time Tasks", Fourth Conference on Software Engineering Research and Practice (Oct. 2004), pp. 1-8.
Deering, S. et al., "ICMP Router Discovery Messages", IETF Standard, Internet Engineering Task Force (Sep. 1991), pp. 1-19.
Sgroi, Marco et al., "A Service-Based Universal Application Interface for Ad-hoc Wireless Sensor Networks", Preliminary Draft (Nov. 26, 2003), pp. 1-39.
Srivastava, Utkarsh et al., "Operator Placement for In-Network Stream Query Processing", Proceedings of the 24th ACM SIGMOD-SIGACT-SIGART Symposium on Principles of Database Systems (Dec. 2004), pp. 1-10.
Vigna, Giovanni "Mobile Code Technologies, Paradigms, and Applications", PhD Thesis, Politecnico di Milano, Milano, Italy, (1998), pp. 1-89.
Buschmann, C et al., "Towards Information Centric Application Development for Wireless Sensor Networks", In Proceedings of the System Support for Ubiquitous Computing Workshop (UbiSys) at the Sixth Annual Conference on Ubiquitous Computing (UbiComp 2004), pp. 1-12.
Overeinder, B. et al., "A Dynamic load balancing system for parallel cluster computing", Future Generations computer Systems, Elsevier Science Publishers, Amsterdam, 12, (1), (May 1996), pp. 101-115.
Foster, I. et al., "Globus: A Metacomputing Infrastructure Toolkit", The International Journal of Supercomputer Application and High performance Computing, MIT Press, US, 11 (2), (Jun. 21, 1997), pp. 115-128.
Ferreira, L. et al., "Introduction to Grid Computing with globus", IBM International Technical Support Organization, 2nd edition (Sep. 2003), pp. 1-58.
Graupner, S. et al., "A framework for analyzing and organizing complex systems", Proceedings of Seventh IEEE International Conference on Engineering of Complex Computer Systems, Jun. 11-13, 2001, Piscataway, NJ, USA, (Jun. 11, 2001), pp. 155-165.
Bornhoevd, C. et al., "Integrating Smart Items with Business Processes an Experience Report", IEEE Proceedings of the 38th Hawaii International Conference on System Sciences (Jan. 3, 2005), pp. 1-8.
Bornhoevd, Christof et al., "Integrating Automatic Data Acquisition with Business Processes Experiences with SAPs Auto-ID Infrastructure", Very Large Data Conference (Sep. 3, 2004), pp. 1-8.
Boudec, Jean-Yves L., et al., "A Theory of Deterministic Queuing Systems for the Internet", Network Calculus, Online Version of the Book Springer Verlag—LNCS 2050, (May 10, 2004), pp. 1-269.
Yoonhee, K. et al., "Wapee: A Fault-Tolerant Semantic Middleware in Ubiquitous Computing Environments", Proceedings of EUC Workshops, 2006, pp. 173-182.
Wiemann, M. et al., "A Service and Device Monitoring Service for Smart Items Infrastructures", Third International Conference on Wireless and Mobile Communications 2007, ICWMC, 6 pages.
Paradis, L. et al., "A survey of Fault Management in Wireless Sensor Networks", Journal of Network and systems management, Kluwer Academic Publishers, NE, vol. 15 No. 2, Mar. 13, 2007, pp. 171-190.
Anke, J. et al., "Cost-based Deployment Planning for Components in Smart Item Environments", IEEE Conference on Emerging Technologies and Factory Automation, Sep. 2006, pp. 1238-1245.

Anke, J. et al., "A Planning Method for Component Placement in Smart Item Environments Using Heuristic Search", Proceedings of the 7th IFIP WG 6.1 International Conference, Distributed Applications and Interoperable Systems, Jun. 2007, pp. 309-322.

Anke, J. et al., "A Service-Oriented Middleware for Integration and Management of Heterogeneous Smart Items Environments", Proceedings of the 4th MiNEMA Workshop, July 2006, pp. 7-11.

Benatallah, B., "Facilitating the Rapid Development and Scalable Orchestration of Composite Web Services", 2005 Springer Science + Business Media, Inc., pp. 1-33.

Buchholz, S. et al., "Adaptation-Aware Web Caching: Caching in the Future Pervasive Web", In: KiVS, (2003), pp. 55-66.

Casati, F., et al "Specification and Implementation of Exceptions in Workflow Management Systems", ACM Transactions on Database Systems, vol. 24, No. 3, Sep. 1993, pp. 405-451.

Basile, Claudio et al., "A Survey of Dependability Issues in Mobile Wireless Networks", Technical Report, LAAS CNRS Toulouse (Feb. 21, 2003), pp. 1-45.

Hasiotis, T., et al., "Sensation: A Middleware Integration Platform for Pervasive Applications in Wireless Sensor Networks", Proceedings of the 2nd European Workshop on Wireless Sensor Networks (Jan. 31, 2005), pp. 1-13.

Hwang, S-Y, et al, "Personal Workflows: Modeling and Management", MDM 2003, LNCS 2574, pp. 141-152.

Kotov, V. et al., "Optimization of E-Service Solutions with the Systems of Servers Library", Hewlett Packard, Modeling, Analysis and Simulation of Computer and Telecommunication Systems (Aug. 29, 2000), pp. 575-582.

Sheng, Q. Z., et al "Enabling Personalized Composition and Adaptive Provisioning of Web Services", CAiSE 2004, LNCS 2084, pp. 322-337.

Golatowski, F et al., "Service-Oriented Software Architecture for Sensor Networks", International Workshop on Mobile Computing (Jun. 17-18, 2003), pp. 1-8.

Decasper, D. et al., "Router Plugins: A Software Architecture for Next Generation Routers", Computer Communication Review (Oct. 1998), pp. 229-240.

Wonohoesodo, R et al., "A Role Based Access Control for Web Services", Proceedings of the 2004 IEEE International Conference on Services Computing (2004), pp. 49-56.

Prabhu, B S., et al., "WinRFID—A Middleware for the Enablement of Radio Frequency Identification (RFID) Based Applications", Mobile, Wireless and Sensor Networks (Mar. 28, 2006), pp. 1-23.

Information Society Technologies, "State of the Art in Resource Management on Wired and Wireless Access Networks with Resilience", Jul. 23, 2004, pp. 1-198.

Carvalho, H et al., "A General Data Fusion Architecture", Proceedings of the 6th International Conference on Information Fusion (Jul. 2003), pp. 1-8.

Hawick, K A., et al., "Middleware for Wireless Sensors and Robots", DHPC Technical Report DHPC-112 (Aug. 18, 2002), pp. 1-6.

European Search Report for Application No. EP07005127.1, mailed Jul. 20, 2007, pp. 1-3.

European Search Report for Application No. EP07008409.0, mailed Aug. 24, 2007, pp. 1-4.

European Search Report for Application No. EP07009428.9, mailed Oct. 4, 2007, pp. 1-4.

European Search Report for Application No. EP07014724.4, mailed Nov. 27, 2007, pp. 1-4.

European Search Report for Application No. EP06023720.3, mailed Apr. 10, 2007, pp. 1-4.

European Search Report for U.S. Appl. No. EP06023256.8, mailed May 9, 2007, pp. 1-5.

Extended European Search Report for Application No. 08017795.9, mailed Feb. 10, 2009, 11 pgs.

"Composite Capability/Preference Profiles (CC/PP): Structure and Vocabularies 1.0", W3C Recommendation (Jan. 15, 2004), pp. 1-78.

Spiess, Patrik et al., "Going Beyond Auto-ID: A Service-oriented Smart Items Infrastructure", Journal of Enterprise Information Management, vol. 20, Issue 3 (2007), pp. 1-9.

Yao, Yong et al., "Query Processing for Sensor Networks", Proceedings of the 2003 CIDR Conference, Jan. 2003, 12 pages.

Skouteli, Chara et al., "Concept-Based Discovery of Mobile Services", Proceedings of the 6th International Conference on Mobile Data Management, Ayia Napa Cyprus. May 13, 2005, 5 pages.

Gounaris, Anastasios et al., "Adaptive Query Processing: A Survey", Lecture Notes in Computer Science, vol. 2405, Archive of Proceedings of the 19th British National Conference on Databases: Advances in Databases, 2002, pp. 11-25.

Hill, Jason Lester, "System Architecture for Wireless Sensor Networks", Dissertation of Jason L. Hill, University of California, Berkeley (2003), 196 pages.

"FAQ: Fault management—How does Fault Management Work?" GoAhead Software (2000), 9 pgs.

Spiess, P., et al, "Collaborative Business Items", Deliverable 401: Management & Maintenance Requirements, CoBIs Project No. IST-004270, Version 1.0 (Jan. 2005), 21 pgs.

"FIPA Device Ontology Specification", Foundation for Intelligent Physical Agents (Apr. 9, 2001), pp. 1-15.

Levis, Philip et al., "TinyOS: An Operating System for Sensor Networks", Feb. 17, 2004, pp. 1-32.

Chatterjee, Mainak et al., "WCA: A Weighted Clustering Alogrithm for Mobile Ad Hoc Networks", Cluster Computing 5, Klluwer Academic Publishers, 2002, pp. 193-204.

Greenstein, Ben et al., "A Sensor Network Application Construction Kit (SNACK)", SenSys '04, Nov. 3-5, 2004, 12 pages.

"The OSGi Service Platform- Dynamic services for networked devices", Retrieved Nov. 16, 2005 from http://www.osgi.org/osgi_technology/index.asp?section=2, 5 pgs.

"TINYOS: Mission Statement", Retrieved Nov. 16, 2005 from http://www.tinyos.net/special/mission, 2 pgs.

Bandara, Ayomi et al., "An Ontological Framework for Semantic Description of Devices", Nov. 11, 2004, 2 pgs.

Vasudevan, Sudarshan et al., "Design and Analysis of a Leader Election Algorithm for Mobile Ad Hoc Networks", Proceedings of 12th IEEE ICNP, Oct. 8, 2004, 11 pages.

Liu, Jinshan et al., "QoS-aware Service Location in Mobile Ad-Hoc Networks", Proceedings of the 5th International Conference on Mobile Data Management, Berkeley, CA USA, Jan. 2004, 12 pages.

Liu, Jinshan et al., "Group Management for Mobile Ad Hoc Networks: Design, Implementation and Experiment", Proceedings of the 6th International Conference on Mobile Data Management, Ayia Napa Cyprus, May 13, 2005, 8 pages.

European Search Report for EP Application No. 07010652.1 mailed on Oct. 26, 2007, 3 pgs.

European Search Report for EP Application No. 07010654.7 mailed on Oct. 5, 2007, 4 pgs.

European Search Report for Application No. 07010671.1 mailed on Nov. 16, 2007, 4 pgs.

"MVP Brochure", Biffone Corporation (2005), www.biffone.com/usa/uploads/mvp.brochure (Retrieved Sep. 20, 2005), pp. 1-3.

Bellavista, Paolo et al., "The Ubiquitous Provisioning of Internet Services to Portable Devices", Pervasive Computing, Jul. 2002, pp. 81-87.

Domagalski, Ronald et al., "Moglichkeiten der Anfragebearbeitung in mobilen Ad-hoc-Netzwerken", English Title: Possibilties of Query Processing in Mobile Ad Hoc Networks, Contribution to the Workshop "Applications of Mobile Information Technology", Heidelburg German, Full length English translation included, Mar. 23-24, 2004, 12 pages.

Spiess, P., et al, "Collaborative Business Items", Deliverable 401: Final Project Report, CoBIs Project No. IST-004270, Version 2.0 (Mar. 2007), pp. 1-42.

Gao, T., et al "Toward QoS Analysis of Adaptive Service-Oriented Architecture", Service-Oriented System Engineering, IEEE International Workshop (Oct. 20, 2005), pp. 1-8.

Non-Final Office Action received for U.S. Appl. No. 11/396,299, mailed on Jul. 9, 2009, 15 pages.

Non-Final Office Action received for U.S. Appl. No. 11/444,119, mailed on Feb. 27, 2009, 23 pages.

Final Office Action mailed Feb. 23, 2009 for U.S. Appl. No. 11/479,284, 29 pgs.

Non-Final Office Action mailed May 14, 2008 for U.S. Appl. No. 11/479,284, 16 pgs.

Non Final Office Action received for U.S. Appl. No. 11/444,119, mailed on Aug. 28, 2009, 19 pages.

Final Office Action mailed May 13, 2009 for U.S. Appl. No. 11/283,618, 32 pgs.

Non-Final Office Action mailed Oct. 28, 2008 for U.S. Appl. No. 11/283,618, 35 pgs.

Final Office Action mailed Jun. 25, 2008 for U.S. Appl. No. 11/284,195, 31 pgs.

Advisory Action mailed Oct. 9, 2008 for U.S. Appl. No. 11/284,195, 4 pgs.

Non-Final Office Action mailed Nov. 1, 2007 for U.S. Appl. No. 11/284,195, 14 pgs.

Tolksdorf, R., "Coordination Technology for Workflows on the Web: Workspace", COORDINATION 2000, LNCS 1906, Springer-Verlag Berlin Heidelberg 2000, pp. 36-50.

US 7,752,304, 07/2010, Bornhoevd et al. (withdrawn)

US 7,801,983, 09/2010, Bornhoevd et al. (withdrawn)

* cited by examiner

US 7,890,568 B2

SERVICE-TO-DEVICE MAPPING FOR SMART ITEMS USING A GENETIC ALGORITHM

TECHNICAL FIELD

This description relates to smart item technologies.

BACKGROUND

Software systems exist that provide various services for enterprises or other organizations. Such software systems may rely on decentralized, manual, and potentially error-prone data collection, while storing collected data in a centralized back-end system where business logic execution also occurs. These and other software systems may be extended through the use of smart item (also referred to as smart device) technologies, in which physical items (e.g., goods, tools, rooms, vehicles, persons, or shelves) are augmented or enhanced by the addition or inclusion of locally-provided or embedded technology.

For example, radio-frequency identification (RFID) systems, embedded systems, sensor motes, and/or sensor networks may be used in the above-described manner to provide business software applications with fast access to real-world data. For example, smart item technologies may be used support the detection, reading, or writing of RFID tags, as well as to support communication with, and control of, wireless sensor networks and embedded systems. In many instances, smart items may include, or may be associated with, devices having local processing power, memory, and/or communication capabilities, and that are capable of providing data about the device and its properties, or information about a current state or environment of the smart item devices. Accordingly, some such devices may be used in the execution of service components of back-end or underlying business applications, and, in particular, may do so in a collaborative way, e.g., by forming mobile ad-hoc networks to collect, process, or transmit business data.

Examples of smart items may include an RFID tag, which may be passive or active, and which may be attached to a physical object, as referenced above, and used to provide product or handling information related to the object. Other examples of smart items may include various sensors, such as, for example, environmental sensors (e.g., a temperature, humidity, or vibration sensor), which, as just referenced, may be capable of communicating to form one or more sensor networks. These and other types of smart items also may include embedded systems, which may refer generally to any system in which a special-purpose processor and/or program is included, and/or in which the system is encapsulated in the device being controlled.

Through automatic real-time object tracking and local, on-site execution of business logic, smart item technology may provide businesses with accurate and timely data about business operations, and also may help streamline and automate the business operations. Accordingly, cost reductions and additional business benefits (e.g., increased asset visibility, improved responsiveness, and extended business opportunities) may be obtained.

SUMMARY

According to one general aspect, a sorted repair structure indicating an ordering of services in accordance with a hierarchy of atomic services and composite services based on a composition of services for one or more devices of a sensor network is determined. One or more derived generation structures based on genetic algorithm logic that is operable on the sorted repair structure is determined. A service is mapped onto at least one device of the sensor network, based on one of the derived generation structures.

According to another general aspect, a system includes a network monitor configured to monitor a plurality of devices of a sensor network, and configured to determine device metadata associated with at least one of the plurality of devices. The system also includes a service mapper configured to determine a base generation structure, based on one or more sorted repair structures indicating an ordering of services in accordance with a hierarchy of atomic services and composite services based on a composition of services associated with the devices, based on the device metadata, and based on service metadata associated with the service, and configured to map a service onto the at least one device based on a derived generation structure that is based on genetic algorithm logic operable on the base generation structure.

According to another general aspect, a service mapper for a sensor network includes genetic algorithm logic that is configured to provide one or more derived generation structures based on service composition logic that is operable on one or more sorted repair structures indicating an ordering of services in accordance with a hierarchy of atomic services and composite services. The service mapper also includes a mapping system that is configured to map a service onto at least one device of the sensor network, based on one of the derived generation structures.

The details of one or more implementations are set forth in the accompanying drawings and the description below. Other features will be apparent from the description and drawings, and from the claims.

DETAILED DESCRIPTION

Figure 1:
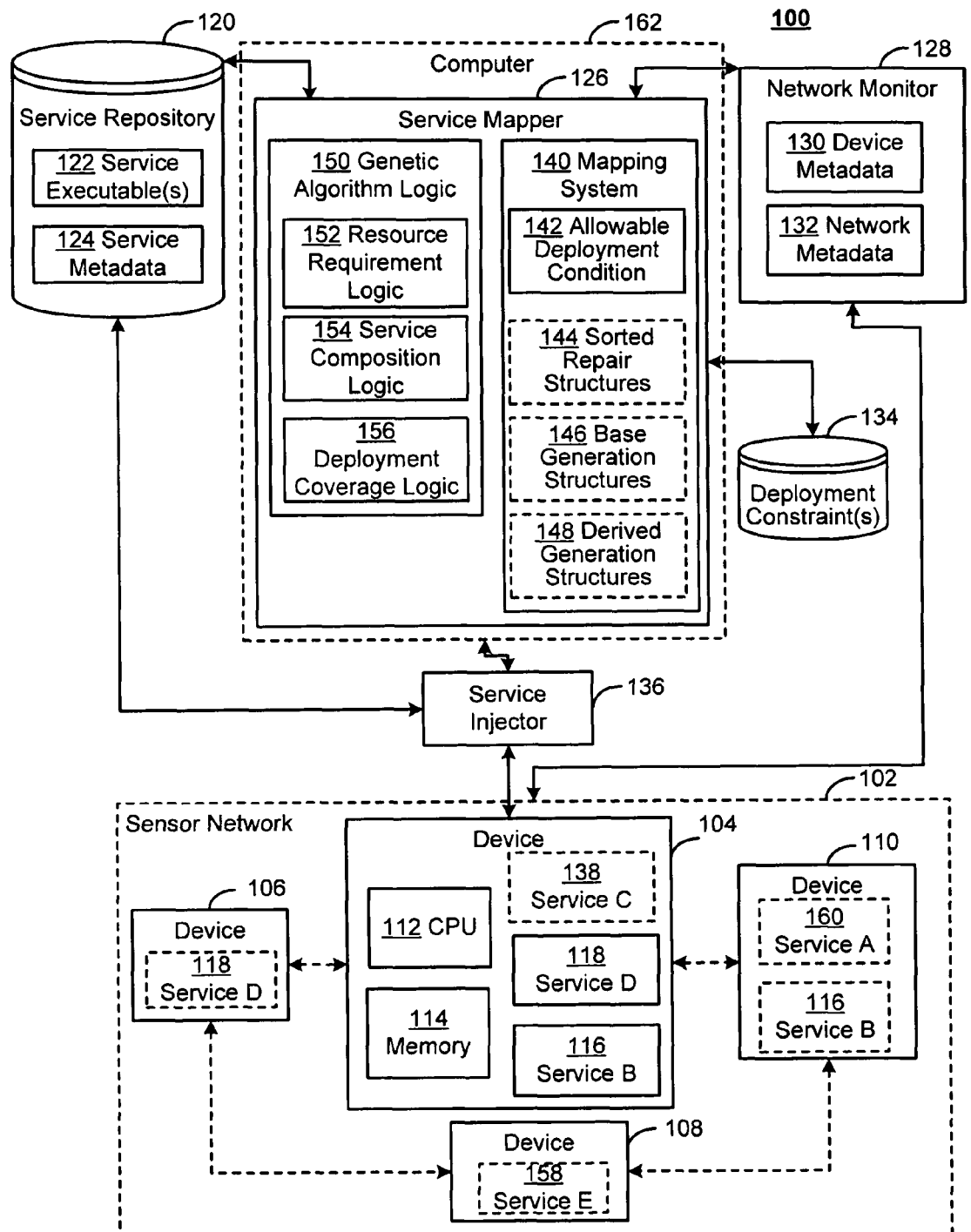
FIG. 1 is a block diagram of an example system for service-to-device mapping for smart items using a genetic algorithm.

FIG. 1 is a block diagram of a system 100 for a service-to-device mapping for smart items using a genetic algorithm. As described in more detail below, the system 100 may be configured to perform a mapping function, using a genetic algorithm, by which services may be mapped onto suitable smart items selected from a plurality of smart items of a sensor network 102. As part of the mapping, and/or subsequent thereto, a deployment of the service(s) onto the smart items may be initiated. Genetic algorithm techniques may be used as part of the mapping process to attempt to produce an optimal mapping. As a result, operators and users of the system 100 may achieve a desired result in a fast, convenient, and reliable manner, even when executing the deployment remotely or automatically, and may thus more conveniently use the system 100 in a desired fashion.

Service mapping may be used when a defined number of instances of a given service are requested to be installed on the network nodes; if a service is a composite service, for example, a service that needs other services installed to function properly, then services from its composition may also be mapped. The sensor network 102 may include nodes that are resource constrained. Thus, consequently, the mapping may be interpreted as a constrained optimization combinatorial problem. Therefore, genetic algorithms may be used in finding a solution, for example, an optimal mapping of the services to the devices of the network. The genetic algorithm techniques described herein for solving the mapping problem may include genetic algorithm concepts such as chromosomes, populations, selection, crossover or recombination, and mutation, and may accommodate consideration of constraints, for example, service constraints, network node constraints, and network constraints. Generally, genetic algorithms may include search techniques used to find approximate solutions to optimization and search problems. Genetic algorithms may be used as a particular class of evolutionary algorithms that use techniques inspired by evolutionary biology such as inheritance, mutation, natural selection and recombination, or crossover.

Genetic algorithms may be implemented as computer simulations in which a population of abstract representations of candidate solutions evolves toward better solutions. The abstract representations may be referred to as chromosomes which include genes, and the candidate solutions may be referred to as individuals. Solutions (e.g., chromosomes and individuals) may be represented using structures including binary digits as strings of 0's and 1's, but different encodings are also possible, e.g., floating point, character, table elements, linked list encodings, etc. The evolution may start from a base population of random individuals and iterate through evolving derived generations. In each generation, a fitness (or unfitness) of the whole population may be evaluated, multiple individuals may be stochastically selected from the current population (e.g., based on their fitness or unfitness), and modified (e.g., recombined or mutated) to form a new, or derived population, which replaces the base population in the next iteration of the algorithm.

The fitness/unfitness may be determined based on a fitness/unfitness function, which may quantify the optimality/grade of constraint satisfaction of a solution (e.g., a chromosome) in a genetic algorithm. Optimal chromosomes, or at least chromosomes which are more optimal, may then be allowed to breed and mix their datasets by any of several techniques, producing a new generation that may include even better chromosomes. As an example of a fitness/unfitness function, consider a health spa for adults that may specify a female's optimal weight to be 60 kilograms. An example unfitness function could then be defined for a female x as:

$$\text{unfitness } (x) = \text{absolute value (actual weight } (x) - 60).$$

Using this example, if a female actually weighs 70 kilograms, then her unfitness may have a value of 10, while a female weighing 60 kilograms may have an unfitness value of 0 (e.g., indicating an optimal weight). Similarly, the female weighing 60 kilograms may be assigned a high value of fitness based on a suitable fitness function, for example:

$$\text{fitness } (x) = 10 - \text{unfitness } (x).$$

An example system and method described further with respect to FIGS. 1-9 is based on genetic algorithm concepts and uses concepts of evolutionary processes, but the example system and method based on genetic algorithms may encompass problem specific knowledge, which may be used to find feasible solutions of the service mapping problem, which may satisfy constraints such as resource constraints and service composition constraints associated with a network.

In the example of FIG. 1, the sensor network 102 may include various smart items or smart devices 104, 106, 108, and 110. That is, it should be understood that the terms "smart items," "smart devices," "smart item devices," and similar terms, may be used similarly or interchangeably in various contexts. For example, the term "smart item" or "smart device" may refer to a device having local processing, storage, and communications capability, as referenced above, or may refer to a combination of such a device and an object to which the device is affixed (e.g., a pallet containing merchandise for sale). As part of the sensor network 102, such devices and/or device/object combinations also may be referred to as "nodes," or "network nodes" in some contexts. In the present description, the term "device" is used for brevity and consistency to refer to the described devices having the described features within the sensor network 102.

Thus, the devices 104, 106, 108, 110, and potentially other devices within the sensor network 102 (and other sensor networks) may provide real-world data to one or more business data processing systems, applications, or processes, in a timely and accurate manner. Examples of such business processes may include, for example, inventory management systems, supply chain management systems, retail store management systems, warehouse management systems, product life cycle management systems, and any other system(s) that may be used to execute business processes with respect to real-world objects, where such real-world objects may include, for example, products for sale, pallets or other shipment elements, patients, or manufacturing materials/equipment. Thus, the business processes, including those portions of the business processes deployed and executed at the local level of the real-world objects, may be used, for example, to determine inventory levels, set pricing levels, evaluate marketing strategies, evaluate manufacturing or production technologies, reduce theft, or maintain safety.

In FIG. 1, the device 104 is illustrated as including a central processing unit (CPU) 112, as well as a memory 114. Thus, the device 104 should be understood to be capable of various levels of computing capabilities, including, for example, processing or transmitting sensed data (in the case where the device 104 includes, or is associated with, a sensor). Although not specifically illustrated in FIG. 1 for the sake of clarity and brevity, it should be understood that the devices 106, 108, and 110 also may include the same or different computing capabilities, including, for example, the capability to form and participate in the local network 102, such as a wireless network and/or a peer-to-peer network. That is, it should be understood that the devices 104, 106, 108, and 110 may include other standard elements and features, not specifically illustrated in FIG. 1 for the sake of brevity, such as, for example, a (e.g., radio) transceiver and a local power supply/battery.

Thus, the local network 102 may be used to collect, process, filter, aggregate, or transmit data that may be useful to related business processes, and, more specifically, may be used to execute portions of the business processes (e.g., business logic), that are best-suited for (or benefit most highly from) local execution. Specifically, in the example of FIG. 1, the portions of the business processes/business logic deployed on the sensor network include service B 116 that is deployed on the devices 104, 110, and service D 118 that is deployed on the devices 104, 106.

Various aspects and characteristics of services such as the service B 116 and service D 118 are described in more detail, below, e.g., with respect to FIG. 3. In general, though, it should be understood that the service B 116 and service D 118, and other services discussed herein, refer generally to software components that support a defined functionality, provide a defined interface through which the service may be invoked, and that may be combined with one another to obtain/provide additional or more complex functionalities. For example, the service B 116 and service D 118 may represent enabling services that, e.g., enable collaboration between two or more of the devices 104, 106, 108, 110; or may represent management services that, e.g., manage power consumption of the device 104; or may represent actual business services that, e.g., execute business-specific logic (such as determining a local temperature, and whether the local temperature exceeds a defined value, and whether any action should be taken in response to the local temperature exceeding the defined value).

More specifically, the service B 116 and service D 118 may represent instances of services (or service templates) stored in a service repository 120. The service repository 120 may thus provide a convenient location for registering, storing, and accessing services that may be deployed for use within the sensor network 102.

The service repository 120 may store service executables 122 and service metadata 124, where the service executables 122 may represent software code that may be instantiated onto the devices 104, 106, 108, 110 for actual execution of associated business logic, while the service metadata may represent or include, for example, various service descriptions and/or requirements that relate to whether and how the service(s) may be executed on one or more devices of the sensor network 102. For example, the service metadata 124 may include a service behavior description, or technical constraints of the service. For example, technical constraints may include a required CPU type or speed, an amount of (free) memory that is needed, a type or speed of connection that is required or preferred, an operating system version/name/description, or a type or status of a battery or other device power source(s). With respect to the service metadata 124, distinctions may be made between static and dynamic service requirements, such as hardware requirements. For example, a static value such as a total memory or maximum processing speed may be included, along with dynamic values such as available memory/processing/power, and/or a number or type of other services that may be allowed to concurrently run on a device together with the service(s) in question, at an execution time of the service(s).

In some examples, the same service may be implemented for a plurality of development platforms, e.g., may be implemented for known development platforms that are based on the C/C++ programming language or the Java programming language. By providing such a diversity of development platforms, a given service may be deployable to a wider range or type of devices that may be in use. Information about the development platform(s) of the service in question may be included as a type of the service metadata 124. Additionally, service interface information describing how the associated service may be called/invoked may be included in, or associated with, the service metadata 124.

The system 100 includes a service mapper 126 that may be configured to select at least the device 104 as a selected device from among the plurality of devices 104, 106, 108, 110 of the sensor network 102, for deploying the service B 116 and service D 118 thereon, as shown. For example, the service mapper 126 may operate in response to a request from an administrator, or may act automatically in response to a command from an associated business process. Thereafter, the service mapper 126 may access the service repository 120, and may determine appropriate information (i.e., information appropriate to the request or command) from the service metadata 124 and the service executable(s) 122.

In determining whether and how to map services from the service repository 120 onto one or more of the devices 104, 106, 108, 110 of the sensor network 102, the service mapper 126 may be in communication with a network monitor 128. The network monitor 128 may be operable to detect or otherwise determine information related to the devices 104, 106, 108, 110, related to the sensor network 102 as a whole (e.g., to interactions between the devices 104, 106, 108, 110), or related to an environment or use of the devices 104, 106, 108, 110. The network monitor 128 may thus provide, for example, hardware health diagnosis, or may provide statistical data for system software (e.g., names and runtime information regarding the service B 116 and service D 118). In some cases, application or service-specific monitoring may be implemented, based on the needs of the application/service. While the network monitor 128 is illustrated in FIG. 1 as a separate component from the sensor network 102, it should be understood that some or all of the network monitor 128 may be implemented at the service level on one or more of the devices 104, 106, 108, 110 of the sensor network 102. For example, the service D 118 may be a locally-deployed monitor service that is operable to collect and report information about a current status of the CPU 112, or the memory 114, or some other local characteristic of information.

Thus, in the example of FIG. 1, the network monitor 128 is operable to determine and provide device metadata 130. For example, the device metadata 130 may include a description of a corresponding device of the devices 104, 106, 108, 110, where the description may be constructed according to an ontology and/or schema that is known to the service mapper 126 and common to the various devices 104, 106, 108, 110. Additionally, or alternatively, the device metadata 130 may be collected in a device-specific format or structure for each of the devices 104, 106, 108, 110, and may thereafter be converted into such a common schema for use by the service mapper 126. For example, the device metadata 130 may include a description of various technical capabilities of the devices 104, 106, 108, 110, provided in an eXtensible Markup Language (XML)-based language, e.g., according to a defined XML schema. Of course, other formats, languages, and/or structures may be used, as well.

More generally, the device metadata 130 may include, for example, a device description, a software description, a hardware description, and a device status. For example, the device description may include a device name, identifier, or type, or may include vendor information including a vendor name or vendor website. The software description may include an operating system description, including version and/or vendor, or may include a description of services running or allowed to run on the device platform. The hardware description may include information about attributes of the CPU 112 (e.g., name or speed), memory 114 (e.g., total amount of memory), or connection capabilities (e.g., connection speed or connection type) of the device(s). The device status may include more volatile information, including a device location, current CPU usage, or remaining power or memory. Of course, other device aspects or information may be included in the device metadata 130, as described below and/or as would be apparent. For example, the device metadata 130 may include information about other devices, such as where the device 104 includes (or is associated with) an RFID reader, and the device metadata 130 may include a description of types of RFID tags that may be read and/or written to by the RFID reader.

Also, although the device metadata 130 is illustrated in FIG. 1 as being determined by the network monitor 128, it should be understood that at least the static device constraints (e.g., total memory or vendor information) may be stored separately, e.g., in a device (metadata) repository (not shown in FIG. 1), similar to the service repository 120. Such a device repository also may be used to store device metadata recently collected by the network monitor 128 (e.g., dynamic but slowly-changing, recently-collected device metadata).

Using at least the service metadata 124 and the device metadata 130, the service mapper 126 may map a given service onto one or more of the devices 104, 106, 108, 110 of the sensor network 102. Such a mapping is designed not only to value-match various aspects of the service metadata 124 and the device metadata 130, where necessary (e.g., matching a required memory specified in the service metadata 124 with a device memory specified in the device metadata 130), but also to enable and optimize a deployment and execution of the service in question. For example, it may be the case that both the device 104 and the device 110 are nominally or ostensibly capable of running the service B 116 (e.g., both devices 104 and 110 may posses some minimum required values of memory, processing capabilities, or power). However, it may be the case that the service B 116 is more power-hungry than memory-hungry (or vice-versa), so that the service mapper 126 may map the service B 116 to the device 104 if the device 104 is currently able to provide more power relative to the other candidate device 110, even if the device 110 currently provides more free memory than the device 104.

Thus, the service mapper 126 may be configured to determine (or attempt to determine) which of the matching or candidate devices is quantitatively and qualitatively best-suited to perform the function of the service in question. For example, a fulfillment priority may be applied that assigns a numeric weight or other priority information to one or more attributes of the service metadata 124 and/or the device metadata 130, so that the service mapper 126 may perform mapping of the associated service(s) accordingly. Of course, many different criteria may be associated with the fulfillment priority, such as, for example, information about a certain type or brand of device, or device platform, that is known to provide some advantage or benefit in executing a service to be deployed, e.g., in terms of reliability. Therefore, in such an example, all devices of this type, brand, or platform may be assigned corresponding priority information.

The network monitor 128 also may determine network metadata 132, such as, for example, various network parameters, particularly where such parameters are dynamic and not necessarily discernable from information about any single device. One such example of the network metadata 132 may include available bandwidth on the sensor network 102. Other examples include location information, mobility characteristics of the network as a whole, and reliability of network connections.

In performing the service mapping, the service mapper 126 also may access other information deemed to be useful or required for the mapping. For example, deployment constraints 134 may include various constraints applicable to one or more services, service deployments, and/or to the sensor network 102 itself. For example, and as discussed in more detail below, the deployment constraints 134 may include constraints requiring a maximization of battery life or battery usage in the sensor network 102, or may otherwise govern service deployment aspects that may be generic to a plurality of services and/or to a plurality of the devices 104, 106, 108, 110.

Once an appropriate service mapping has been performed by the service mapper 126, a service injector 136 may be used to install and start/activate the mapped service (e.g., the service B 116) on the device 104. The service injector 136, more generally, also may be used to manage a life cycle of the service(s), e.g., by performing service updates or stopping the service when necessary.

Thus, one task of the service injector 136 is transferring concrete service code (e.g., an appropriate one of the service executable(s) 122) to the selected/mapped device(s). Thus, the service injector 136 receives and installs the kind of code in question. Such an install component as the service injector 136 may be installed on the device-side, e.g., as a single standalone software component, or may cooperate with other installation components in order to distribute instances of the (mapped) service executables 122. After installing the instances of the service executable(s) 122, the service B 116 may be kept in an inactive state until the service injector 136 sends a start-up signal to change the service B 116 to a started, or active state. In a similar way, the service injector 136 may be used to organize the updating, stopping, or removal of services. Once mapping of the service B 116 has occurred, and the service B 116 has been installed and started on the device 104, then execution of the service B 116 may continue, as needed.

In the following examples, reference is made to a service C 138 that is to be deployed onto one or more devices of the sensor network 102. That is, it is assumed that a request for a mapping and deployment of the service C 138 has been received, so that subsequent mapping by the service mapper 126 may proceed accordingly. As such, and from the above explanation, it should be understood that the service C 138 may ultimately be deployed to whichever of the devices 104, 106, 108, 110 is determined to be best-suited for execution of the service C 138. In the examples below, the service C 138 is generally discussed as being mapped to, and deployed to, at least the device 104, as shown in FIG. 1.

In performing the mapping, the service mapper 126 may include a mapping system 140. As described, the mapping system 140 may be configured to receive a request for a service deployment (e.g., from a user entering a request to deploy a specified service, or in conjunction with the business process(es) that requires a service to be deployed). Based on the request, the mapping system 140 may determine that the service C 138 should be mapped and deployed onto at least one device of the sensor network 102, and, accordingly, may determine the service executable 122 of the service C 138, as well as associated service metadata 124, from the service repository 120. Current device metadata 130 may then be obtained for some or all of the plurality of devices 104, 106, 108 110, e.g., using the network monitor 128. Then, the mapping system 140 may determine a selected device (e.g., the device 104) from the plurality of devices 104, 106, 108, 110, based on the service metadata 126 and the device metadata 130 (and/or based on the network metadata 132).

In some cases, however, it may be the case that such a mapping and deployment initiated by the mapping system 140 may not succeed, or may only partially succeed. For example, as should be understood from the above description, an allowable deployment condition 142 may be required to exist at a time of the deployment, in order for successful deployment of the service C 138 to occur. The allowable deployment condition 142 may include, for example, that the deployment constraints 134 are met, or that service requirements (specified in the service metadata 124) associated with the service C 138 may adequately be met by device constraints (e.g., specified in the device metadata 130) associated with a device(s) of the sensor network 102. In the latter case, for example, the service C 138 may require a certain amount of free memory, or a certain processor speed, so that device constraints associated with a given device, such as the device 104 (e.g., with the memory 114 or the CPU 112) may not be sufficient to satisfy the service requirement(s), particularly given that the service B 116 and service D 118 are already being hosted and run by the device 104.

In the example of FIG. 1, then, it should be understood that the terms "deployment condition" and "allowable deployment condition," or similar terms, may refer at least in part to condition(s) of physical conditions existing (or desired/required to be existing) with respect to the sensor network 102, such as a number or type of services deployed on the sensor network 102, an amount of the memory 114 existing or available for deployment of services, or a deployment constraint. In other words, such deployment conditions may overlap or encompass, in the context of a particular deployment at a particular time, some or all of the service metadata 124, the device metadata 130, the network metadata 132, or the deployment constraint(s) 134. Thus, such deployment conditions may represent a matching or fulfillment (or lack thereof) between the service metadata 124, the device metadata 130, the network metadata 132, or the deployment constraint(s) 134, for (in this case) deployment of the service C 138 onto the sensor network 102. As such, such deployment conditions may be represented, in whole or in part, as, for example, XML documents that describe the associated physical conditions for use by the mapping system 140 (as represented by the allowable deployment condition 142), where parameters of such XML documents at a given time may be determined from the service repository 120, the network monitor 128, and the deployment constraints 134.

For example, as referenced above, the service C 138 to be deployed in the example of FIG. 1 may be associated with the service metadata 124, which may include requirements of the service C 138 that are needed for the service C 138 to be successfully deployed and executed. Each such requirement may be provided within the service repository 120 as a range of acceptable values (e.g., from a minimum to a maximum acceptable value(s)), rather than as a single value. For example, the service C 138 may be associated with service requirements specifying that the service C 138 should be deployed only to a device having available memory, battery power, and/or transmission speed within certain specified ranges, e.g., min-max ranges.

In one example illustrated in FIG. 1, it may be the case that the service mapper 126 first attempts to map and deploy the service C 138 onto the sensor network 102, and, in so doing, may determine that the device 104 is the most likely candidate device for receiving the service 138 (due to, for example, local capabilities/functionalities of the device 104, or due to the device 104 (and associated device constraints) being closest of all available devices to matching the service requirements associated with the service C 138.

As described above, the deployment constraints 134 may generally refer to globally-applicable constraints, i.e., may refer to global constraints associated with the sensor network 102. Examples of the deployment constraints 134, as also referenced above, may include constraints requiring that all deployments (or a certain deployment): minimize battery usage, minimize memory usage, or minimize usage of processing power. Further, the deployment constraints 134 may designate that it is more important to minimize memory usage, or may designate that it is more important to minimize battery usage, even if sub-optimal memory usage or processing power occurs as a result. Thus, in the latter case, for example, the mapping system 140 may select the device 104 as being extremely power-efficient, and may thus determine that the device 104 is potentially well-suited for deployment of the service C 138.

Deployed services may include certain enabling services that may not be removed from an associated device without severely restricting an operation of the associated device and/or the sensor network 102 as a whole. For instance, it may be the case that the service D 118 is associated with a component or functionality of the service injector 136, so that removal of the service D 118 would thereafter render it impossible to inject new services onto the device 104. As a result, the mapping system 140 and associated algorithm(s) may include logic for ensuring that the service D 118 is not removed from the device 104.

The service mapper 126 includes logic that may be configured to determine one or more sorted repair structures 144 included in the mapping system 140 based on predetermined composition requirements of services to be mapped to the sensor network 102, for a request to map one or more services to the sensor network 102. The sorted repair structures 144 may include structures, for example, bit strings representing services to be installed on network nodes. The bit values included in the structures may be sorted to indicate an ordering of services in accordance with a hierarchy of atomic services and composite services based on a composition of services for one or more devices of a sensor network, which may include, for example, ordering the bits corresponding to each of the atomic services in an order preceding the bits corresponding to all composite services that depend on the atomic service in a hierarchical ordering of the corresponding requested services. The ordering may further include, for example, ordering based on priorities among atomic services and composite services. Thus, in an example processing of services, by processing the services in the ordering indicated by the sorted repair structures, it may be unnecessary to backtrack when processing a composite service, as the services upon which the composite service depends may have been previously processed.

Therefore, services may either be implemented as single or atomic services that are substantially self-contained in their execution, or may be implemented as composite or combined services, so that services running on different devices of the sensor network 102 may collaborate to form composite services that a single service/device may not be capable of offering in a proper or efficient way. A composition requirement may include provisions for composite services, such that any particular composite service may need other services, for example, to be installed at specified locations and, for example, to be in a specified state in order for the particular composite service to run properly. For example, a composition requirement may specify that a service W needs a service X such that the service X is installed on the same device or node as service W (i.e., a local location) and service X is in a running state. As an example, locations may include local, neighbor and network locations, wherein a designation of local or neighbor refers to a node location of a service relative to the node location of the composite service. Example states may include a deployed state and a started, or running state.

A service composition may include complex compositions. For example, service W may need service X in a local location and a started state, service Y in a neighbor location and a deployed state, and service Z in a network location and a started state. The services X, Y, and Z may also need other services for their execution. Thus, the mapping of service W may also cause the mapping of all services from its composition, if they have not already been mapped. As one specific example, the service C 138 may collect and aggregate sensor data, e.g., room temperature, which may be measured and sent by each of service D 118 and service E 158.

The service mapper 126 may further include logic configured to determine one or more base generation structures 146 based on the sorted repair structures 144, as well as logic configured to determine one or more derived generation structures 148 based on the sorted repair structures 144 and the base generation structures 146. For example, the base generation structures 146 may include structures representing chromosomes including genes for use by a genetic algorithm. The derived generation structures 148 may include structures representing chromosomes including genes that are derived by a genetic algorithm based on the base generation structures 146 and the sorted repair structures 144. The base generation structures 146 and the derived generation structures 148 may represent binary chromosomes, each of which represents a potential solution of the mapping problem. The size of each chromosome may be determined, for example, based upon the size of the network and the number of services to be deployed.

For example, if a network includes 3 nodes and a service composition, for example, indicating service composition of 5 requested services, and the 5 services are requested to be installed onto the network, an example chromosome may include 15 binary values, determined as the number of network nodes multiplied by the number of requested services. Each example chromosome may include 5 parts, each part corresponding to one of the 5 services, and each part may include 3 genes, each gene corresponding to one of the 3 network nodes. For example, if a gene has a value of 1, the corresponding service may be deployed to its corresponding node. One possible chromosome may then have a value of "001 101 011 111 000". For this example, parts of the chromosome may reference services in an order Y, Z, W, X, and V. Thus, according to the example chromosome, the service Y, represented by the first three bits, may be installed on the third node, the service Z, represented by the second three bits, may be installed on the first and third nodes, the service W may be installed on the second and third nodes; the service X may be installed on all nodes, and the service V may be not installed at all. The sorted repair structures 144 may include a structure similar to the base generation structures 146 and the derived generation structures 148.

Further, the service mapper 126 may include genetic algorithm logic 150 configured to determine at least the sorted repair structures 144, the base generation structures 146, and the derived generation structures 148 based on resource requirement logic 152, service composition logic 154, and deployment coverage logic 156.

The service composition logic 154 may include logic addressing the composition requirements of services to be mapped to the sensor network 102, as discussed above. As a further example, a composite service A 160 of FIG. 1 may utilize the service B 116, and service C 138, which further utilizes the service D 118 and service E 158. Thus, the service composition logic 154 may be configured to map composite services to ensure, e.g., that a request to map the service A 160 to a device on the sensor network 102 will result in an appropriate mapping of all of the service A 160, service B 116, service C 138, service D 118 and service E 158 to devices on the sensor network 102. Therefore, for this example, the whole composition hierarchy may be mapped.

The deployment coverage logic 156 may include logic addressing deployment coverage requirements associated with the services to be mapped onto the devices of the sensor network 102. A deployment coverage requirement may indicate a number of instances of a particular service that should be installed in the network to support a smooth functionality of the service. The deployment coverage may be represented as an absolute indicator, for example, the service must be mapped to 5 nodes, or as a relative indicator, for example, the service must be mapped to 25% of the relevant nodes. Thus, the deployment constraints 134 may provide a global or governing strategy for executing a given service mapping/deployment. Therefore, deployment coverage requirements may be met by mappings of services to the devices of the sensor network 102.

For example, a generation, e.g., the base generation structures 146 and the derived generation structures 148, may include a group of generation structures referred to as chromosomes, which represent a group of potential solutions of the service mapping problem. The first generation chromosomes, e.g., the base generation structures 146, may be generated randomly by the genetic algorithm logic 150. At least one of the sorted repair structures 144 may be used for checking of resource requirements on each randomly generated chromosome. After the base generation structures 146 are created, an evolutionary technique may be applied by the genetic algorithm logic 150 to generate second, or derived generation structures 148. A genetic algorithm technique of selection may be used to select the best structures (e.g., chromosomes) from the base generation structures 146 for generation of the derived generation structures 148. A genetic algorithm technique of recombination, or crossover, may be applied to a group of the best chromosomes from the base generation structures 146, but some of the chromosomes may be accepted for the derived generation without any changes, according to a predetermined probability.

In order to achieve better diversity, some of the chromosomes may be mutated according to a predetermined probability of mutation. After the creation of each new population or derived generation, each of the chromosomes may be repaired and its unfitness/fitness may be determined based on an unfitness/fitness function. As an example, an unfitness function may measure the difference between the number of instances of a particular service to be deployed as a result of the mapping indicated by the chromosome, and the number of instances of a particular service required to be deployed, for example, according to information that may be included in the service metadata 124, the network metadata 132, the deployment constraints 134, and/or the allowable deployment condition 142.

Since the mapping problem may be constrained, problem specific knowledge may be applied in the genetic algorithm techniques of the genetic algorithm logic 150 via a repair process and an unfitness function in order to solve a constraint satisfaction aspect of the mapping problem. Thus, after the generation of each population or generation, the chromosomes of the generated population may be modified; for example, the chromosomes may be modified in order to satisfy desired constraints. For example, the resource requirement logic 152 may determine whether all resource requirements are satisfied. For this purpose the genetic algorithm logic 150 may generate a list of services which will be installed on each node and determine whether all the services may be installed based on an analysis of the available resources of the node. If it is not possible to install all of the services on the node, some genes of the chromosome may be set to zero, indicating that some services may not be installed on the node, so that the resource requirements may be satisfied.

The service composition logic 154 may include repairing the chromosomes based on a determination of whether the composition requirements are satisfied. For example, the composition requirements may specify that a service X must be installed in a same node as service Y. If the composition requirement is not satisfied for some services, the corresponding genes of the corresponding chromosome may also be set to zero.

The deployment coverage logic 156 may further evaluate the deployment coverage requirement. Thus, for example if there are too many instances of a particular service which will be installed according to a particular chromosome, a corresponding number of genes of the chromosome may be set to zero in order to avoid violating the deployment coverage requirement (e.g., by exceeding the number of allowed instances of the service), which may be included with the deployment constraints 134. Therefore, the repair process may ensure that each chromosome represents at least a partially feasible solution, as it is possible, for example, that too few instances of a service may be mapped to the network. In order to avoid this problem, the unfitness of all chromosomes may be determined by an unfitness function such that, if the unfitness of a chromosome equals zero, then the chromosome represents a feasible solution. For example, the unfitness function may be defined as the difference between the number of allowed instances and the actual number of instances to be installed, such that an unfitness value of zero indicates an optimal solution with regard to the deployment coverage requirement regarding the number of instances allowed to be installed.

As shown in FIG. 1, the service mapper 126 may include software to be executed, in whole or in part, on a computer 162, such as a personal computer, workstation, or on any suitable computing device. For example, a user or administrator may install some or all of the service mapper 126 software onto the computer 162, and may interact with the service mapper 126 software using a graphical user interface (GUI) viewed on an associated display. In another example, some or all of the service mapper 126 may be installed on a remote computer, over a wide area network such as the Internet, and the user may access the service mapper 126 over the network, e.g., as a web-based graphical user interface.

For instance, such GUIs, whether local or web-based, may include fields or other input/output techniques that allow the user to set the deployment constraints 134, alter the service metadata 124, or develop/modify and/or register a service executable 122 with the service repository 120. The user also may use the GUI, or another suitable user interface(s) to, for example, initiate a service mapping (such as selecting a service and/or sensor network for a desired mapping), or to set parameters associated with the service mapper 126.

The service mapper 126 may be in communication with business processes executing in whole or in part on the computer 162, or executing on a remote computer and/or network. For example, the business processes may be located at a corporate headquarters, and the sensor network 102 may represent one of many (types of) networks that may be dispersed across a large geographical region connected by a wide area network.

Thus, any or all of the back-end business processes, the service repository 120, the network monitor 128, the service injector 136, or the sensor network 102, may be dispersed from one another across a relatively large geographical area that is connected by a wide area network, which may include, for example, the Internet or an enterprise-wide proprietary network. The service repository 120, the deployment constraints 134, the service injector 136, and the network monitor 128 may be installed in whole or in part on the computer 162, e.g., may be stored in a memory of the computer 162. For example, the network monitor 128 may include a server component, e.g., an application server, executing on the computer 162. At the same time, as referenced above, at least portions of, for example, the service mapper 126, the network monitor 128, and the service injector 136 may be stored/executed on a separate computing device, including, for example, a portable computing device (e.g., a laptop computer or personal digital assistant (PDA)), or may be stored/executed on one or more of the devices 104, 106, 108, 110 of the sensor network 102.

Techniques for communication between the computer 162 (or other just-described examples or variations of the computer 162) with devices of the sensor network 102 may vary, for example, on the types of devices. For example, the devices and/or embedded systems may represent anything from small-scale, one-chip microcomputers, all the way to full-blown PC hardware. Thus, for example, for devices that have the capabilities of a mobile phone or more (e.g., are able to run a Java Virtual Machine™ or other middleware platform(s)), implementation may be performed in Java™ and/or based on the Open Services Gateway initiative (OSGi), which represents a known framework for implementing a component model for remote installation and management of applications and/or application components.

Figure 2:
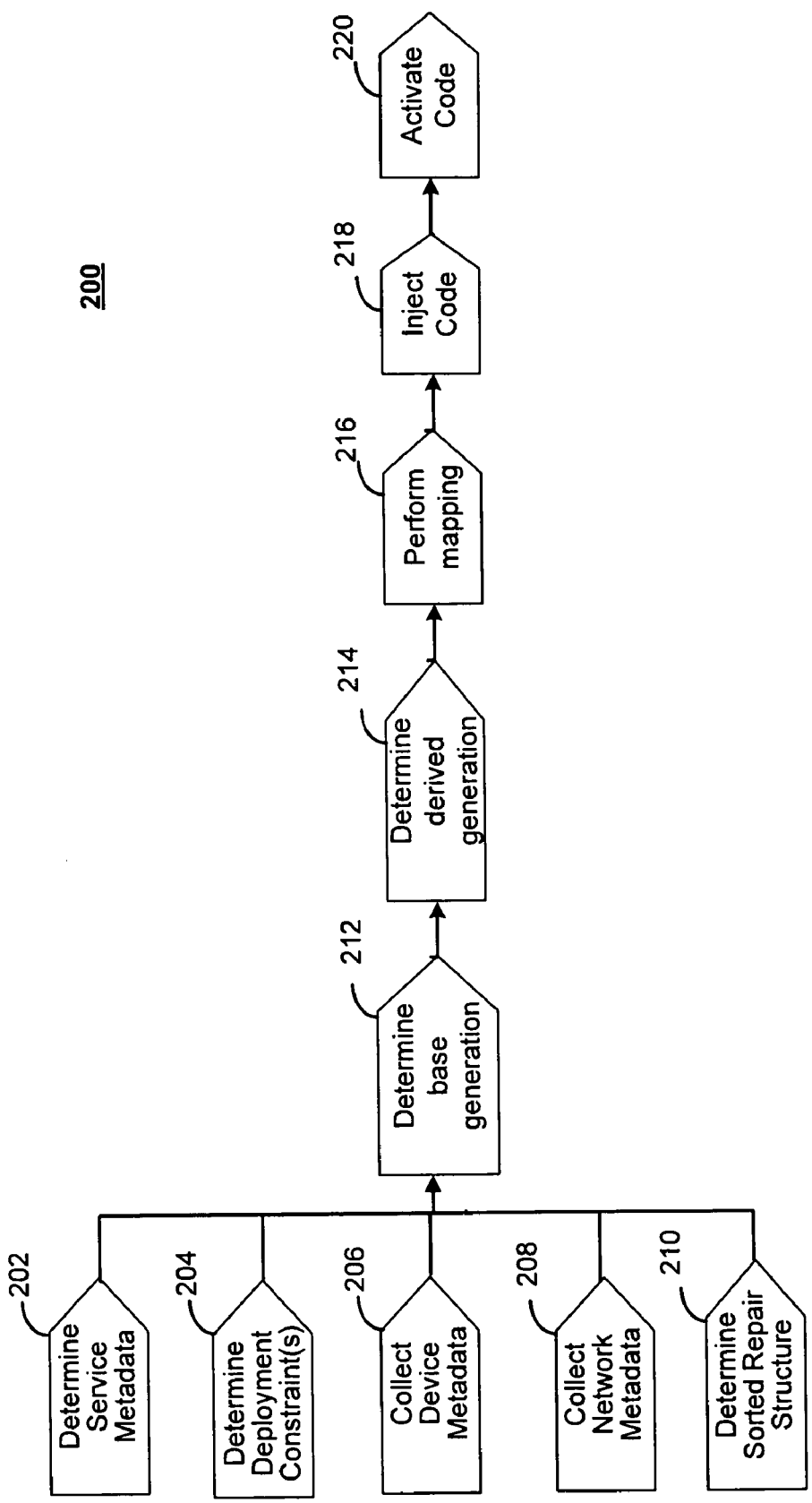
FIG. 2 is a flowchart illustrating example operations that may be performed by the system of FIG. 1.

FIG. 2 is a flowchart 200 illustrating example operations of the system of FIG. 1. In FIG. 2, as referenced above, the associated processes and operations may be initiated or requested by users or business applications that wish to use particular (e.g., currently not running) services of the sensor network 102 (e.g., services registered with the service repository 120).

Thus, in FIG. 2, service metadata (202) is determined that, as described above, may include or reflect service requirements (e.g., processor type, available memory, or requested bandwidth) that potential devices should fulfill in order to be able to host a specified, associated service (e.g., to host the corresponding executable code component from the service executables 122 of the service repository 120). As described, at least some of these requirements may define an acceptable/tolerable range of a measurable property, such as, for example, available memory.

Similarly, deployment constraints may be collected (204), such as the deployment constraints 134 that may include, for example, more global constraints, such as an expected number of devices that are preferred or required to host the service in question (in other words, a desired coverage of the sensor network 102). That is, for example, although the service C 138 is illustrated in FIG. 1 as being deployed to the single device 104, it should be understood from the nature and possible uses of the sensor network 102 that, in many cases, instances of the service C 138 may be deployed to a plurality of the devices 104, 106, 108, 110 of the sensor network 102. In this way, for example, a service for detecting temperature (or other physical or environmental parameter) may be deployed over a sufficiently-wide physical area. As another example, multiple instances of the service B 116 may be deployed to different devices such as devices 104, 110, in order to obtain a desired level of redundancy of the system 100.

Generally, then, the service metadata 124 (and associated service requirements) and the deployment constraints 134 represent information that may be stored and accessed from an appropriate memory or data store. For example, service requirements and any corresponding data may be specified by a developer of the service component(s), and stored in a properly-formatted file or database that is available to the service mapper 126. For example, although FIG. 1 illustrates the service metadata 124 stored in the service repository 120, with the deployment constraints 134 stored separately, it should be understood that any suitable storage scheme(s) may be used; for example, the service metadata 124 and the deployment constraints 134 may be stored together (or in association with one another) in a memory associated with a general requirements data storage.

However stored, the service requirements and the deployment constraints 134, or other requirements, may be associated with a fulfillment priority, which may be designed to indicate the importance of each associated type of requirement. For instance, such a fulfillment priority may indicate that the usage of a certain processor type (e.g., the CPU 112) may be more important than a remaining memory (e.g., memory remaining in the memory 114) after the installation of the service C 138. As also referenced, such fulfillment priority information, as applied generally to services (and deployments thereof) of the sensor network 102, may be used, for example, in reducing the service requirements (within a range(s)), reconfiguring the sensor network 102, or removing service components from the sensor network 102.

Further in FIG. 2, a second type of basic input data includes information about currently-available capabilities of devices in the sensor network 102, or of the sensor network 102 itself. Accordingly, the device metadata 130 may be collected (206), which may include, for example, various static parameters (e.g., vendor name, CPU type, or list of installed/running service components), as well as various dynamically-changing parameters (e.g., remaining battery or memory) of one or more of the devices 104, 106, 108, 110 of the sensor network 102. Still further, the network metadata 132 may be collected (208), which may include, for example, information about the topology of the sensor network 102 (e.g., neighborhood relationships, or available bandwidth between devices).

As understood from the description of FIG. 1, the device metadata 130 and the network metadata 132 may be collected by the network monitor 128. For example, in one implementation, a monitoring process of the network monitor 128 may assume that the target devices 104, 106, 108, 110 have information regarding their capabilities and current status. For instance, the devices 104, 106, 108, 110 may store, continuously update (if required), and retrieve data relevant to monitoring. The network monitor 128 may either actively request relevant data from the devices 104, 106, 108, 110, and/or the devices 104, 106, 108, 110 may autonomously indicate changes in current configuration(s). For instance, the device 104 may include the service D 118, which may be part of, or associated with, the network monitor 128, and which may indicate if a battery status (or virtually any other parameter) of the device 104 reaches a pre-defined level, e.g., a level determined to be critically low.

Further, the sorted repair structures 144 may be determined (210), for example, by the service mapper 126 of FIG. 1, based on composition of services information. As understood from the description of FIG. 1, the sorted repair structures 144 may be determined, for example, based on a hierarchical ordering of atomic services and composite services such that the ordering includes a particular service in the ordering before any services that depend on the particular service, and based on, at least, for example, information stored in the service metadata 124 and network metadata 132.

Based on the above-described input data (202-210), and as understood from the description of FIG. 1, the service mapper 126 may execute at least the genetic algorithm logic 150 to determine a base generation (212) and to determine a derived generation (214) based on a result of the determined base generation (212). The service mapper 126, based on the determination of the derived generation (214), may then perform a mapping (216) of requested services to devices of the sensor network 102. Then, an output of the service mapping may include a set of instructions for performing code injection (218). Specifically, after successful mapping of service(s), the service injector 136 may be used to transfer executable service components to the respective selected devices. Depending on an available network infrastructure associated with the service network 102, the code injection may be performed, for instance, in a device-by-device fashion, in which the service injector 136 may send a message to the target node(s) containing appropriate commands, e.g., "remove the service B 116 and install the service C 138." In this case, the appropriate service executable may be transmitted to the device 104 from the service repository 120.

Once a device receives a certain set of commands and services from the service injector 136, the service may be activated (220). Such activation may depend in part on the specific associated hardware platform associated with the device(s).

Figure 3:
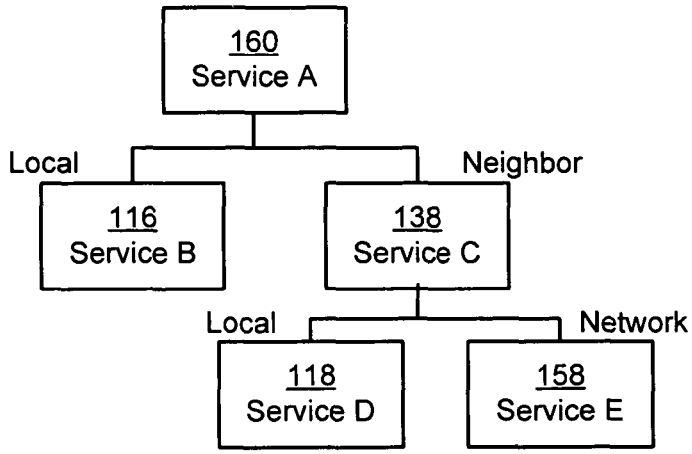
FIG. 3 is a block diagram illustrating an example service composition hierarchy that may be utilized by the system of FIG. 1.

FIG. 3 is a block diagram illustrating an example service composition hierarchy 300 that may be utilized by the system of FIG. 1. According to the service composition hierarchy 300, a composite service A 160 of FIG. 3 may utilize the service B 116, and service C 138, which further utilizes the service D 118 and service E 158. The service B 116 may need to run on the same node as the service A 160 (i.e., locally), and the service C 138 may need to run on a neighbor node to the node of the service A 160. Further, the service D 118 may need to run on the same node as the service C 138, and the service E 158 may only need to run on the same network as the service C 138. Thus, for example, the service composition logic 154 of FIG. 1 may be configured to map composite service A 160 and atomic service B 116 to the device 110 of FIG. 1, additionally mapping the composite service C 138 and atomic service D 118 to the device 104, further mapping the atomic service E 158 to the device 108 of the sensor network 102, thus satisfying the composition requirements of service A 160 based on the service composition hierarchy 300.

Figure 4:
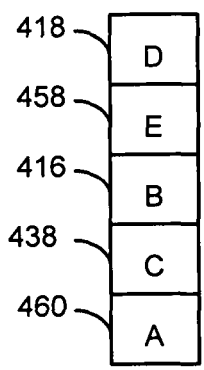
FIG. 4 is a block diagram illustrating an example sorted services list that may be utilized by the system of FIG. 1.

FIG. 4 is a block diagram illustrating an example sorted services list 400 that may be utilized by the system of FIG. 1. The example sorted services list 400 shown in FIG. 4 is based on the example service composition hierarchy 300 of FIG. 3. The sorted services list 400 may be a list of services to be mapped to the network, for example, as a result of a request for a mapping of services. For example, if service A 460 is requested to be installed on/mapped to the network, then all of the services B 416, C 438, D 418, and E 458 from its composition should be installed. In the example the sorted services list 400 includes the five services A 460, B 416, C 438, D 418, and E 458. The list may then be sorted according to a composition tree such as the example service composition hierarchy 300 of FIG. 3. Thus, for example, as a result of the sorting, indicators of atomic services may be positioned at the beginning of the list, and indicators of other services may be positioned in the list according to the hierarchy in the composition tree. The example sorting may thus provide an ordering of services such that the service located at position j in the list does not need the service located at position i in the list, where 1<=j< the size of the list and j<i<=the size of the list.

For example, the sorted services list 400 may indicate services ordered according to a sequencing: D 418, E 458, B 416, C 438, A 460. Thus, the ordering may indicate that service D 418 does not need services E 458, B 416, C 438, A 460, service E 458 does not need services B 416, C 438, A 460, service B 416 does not need services C 438 and A 460, and service C 438 does not need service A 460. The sequencing of services in the list may thus facilitate a more efficient repair process as part of the genetic algorithm logic 150 of FIG. 1, discussed further with regard to FIGS. 6-9. More particularly, for example, by starting repair of a chromosome by considering the services according to the ordering, and stepping through a repair process considering each service according to the ordering indicated by the sorted services list 400, a repair performed on service j may not need to further consider an effect by the repair on services upon which the service j may depend, as those services may have already been considered for repair, according to the ordering.

Figure 5:
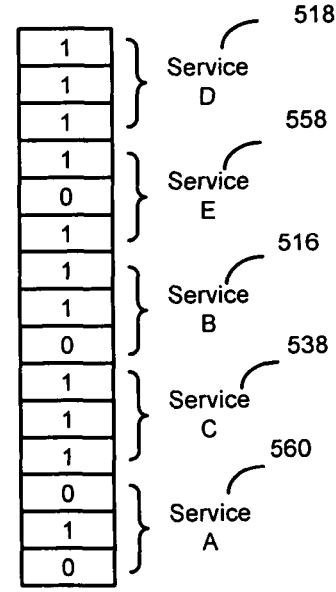
FIG. 5 is a block diagram illustrating an example sorted repair structure that may be utilized by the system of FIG. 1.

FIG. 5 is a block diagram illustrating an example sorted repair structure 500 that may be utilized by the system of FIG. 1. However, the sorted repair structure 500 indicates an example network that includes 3 nodes, while the example sensor network 102 of FIG. 1 includes at least 4 nodes, or devices 104, 106, 108, 110. The example sorted repair structure 500 may be used for a high level pre-analysis of resource requirement satisfaction, e.g., by the genetic algorithm logic 150 of FIG. 1 in determining the base generation structures 146, as well as the derived generation structures 148. The example sorted repair structure 500 may be represented analogously to a potential solution to the mapping problem represented as a chromosome, which may be implemented, for example, as a string of binary values. The size of the chromosome may be determined as the number of nodes (n) of the sensor network 102 multiplied by the number of services (s) to be mapped. As shown, the example sorted repair structure 500 indicates 3 nodes included in a network, with 5 services requested to be installed, for example, services A 560, B 516, C 538, D 518, and E 558. Thus, the chromosome represented by FIG. 5 includes 15 genes, with each gene indicating whether a particular service is to be mapped to a particular node in the network.

Thus, according to the representation of FIG. 5, the first 3 genes of the chromosome may represent a mapping of a first service, the next 3 genes may represent a mapping of a second service, etc. Each gene of the chromosome may thus have a binary value, for example, if the gene has a value of 1, the corresponding service may be mapped to the associated node, else the corresponding service may not be mapped to the associated node. The size of the example repair structure 500 may correspond to the size of each one of the base generation structures 146, which also may include binary values. It is of course possible that other types of values may be used, for example, floating point, character, strings, lists, etc. Each value of the sorted repair structure 500 may thus indicate the installation of a respective service to a corresponding node in the network. Thus, a sorted repair structure 500 value of 1 may indicate that the respective represented service can be installed on the respective represented node (i.e., resource constraints may not be violated if the service is installed), and a value of 0 may indicate that the service cannot be installed on the node, for example, because either the node can not provide enough resources to support the service, or the service is already installed on the node.

The example sorted repair structure 500 may be based on the service metadata 124, device metadata 130, network metadata 132, and deployment constraints 134 of FIG. 1, the example sorted services list 400 of FIG. 4, and the example service composition hierarchy 300 of FIG. 3, for a sensor network including three devices such as the devices 104, 108, and 110 of FIG. 1, in an ordering 104, 110, 108. Thus, a request to map service A 160 to the sensor network 102 may result in the service mapper 126 initializing the sorted repair structure 500 to have a value "111 101 110 111 010" which indicates that service D 518 may be installed on all nodes (e.g., devices 104, 108, and 110), service E 558 may be installed on the first and third nodes (e.g., devices 104 and 108), service B 516 may be installed on the first and second node (e.g., devices 104 and 108), service C 538 may be installed on all nodes (e.g., devices 104, 108, and 110), and service A 560 may be installed on the second node (e.g., device 110).

The example sorted repair structure 500 as shown may not account for situations wherein several services may be installed on the same node. In the example, any one of services D 518, E 558, B 516, and C 538 may be installed separately on the first node according to the sorted repair structure 500, but the example sorted repair structure 500 may not indicate whether all of services D 518, E 558, B 516, and C 538 may be installed on the first node simultaneously.

Figure 6:
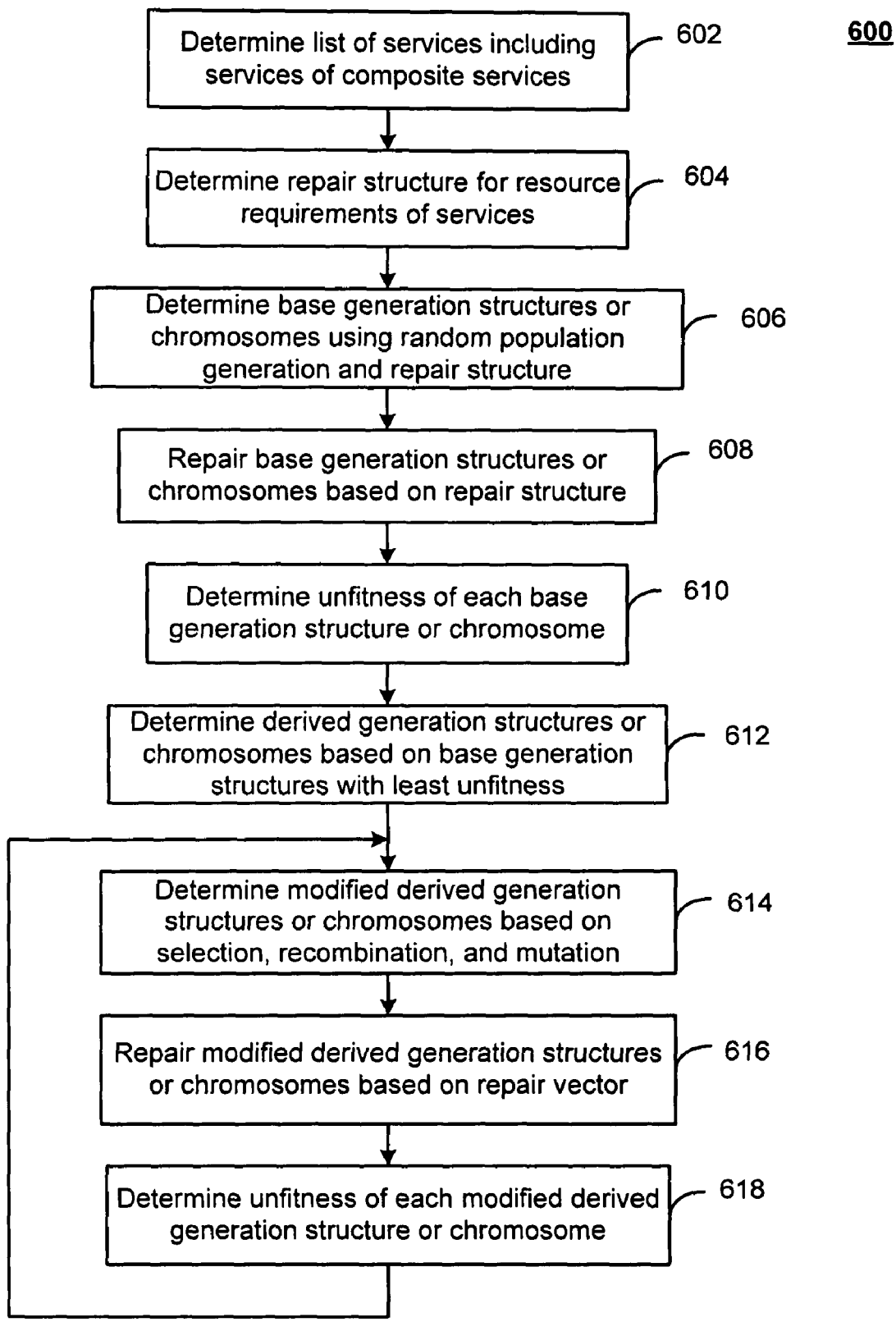
FIG. 6 is a flowchart illustrating additional example operations that may be performed by the system of FIG. 1.

FIG. 6 is a flowchart 600 illustrating additional example operations of the system 100 of FIG. 1. A list of services, e.g., the sorted services list 400 as discussed with regard to FIG. 4, to be mapped to the sensor network 102, may be determined (602), for example, as a result of a request for a mapping of services. For example, if service A 160 is to be installed/mapped to the network, then all of the services B 116, C 138, D 118, and E 158 from its composition may be installed. In this example, the sorted services list 400 may include indicators of the 5 services A 460, B 416, C 438, D 418, and E 458. The list may then be sorted, for example, according to a composition tree, e.g., the example service composition hierarchy 300. Thus, for example, as a result of the sorting, atomic services may be located at the beginning of the list, and other services may be located in the list in an ordering corresponding to the hierarchy in the composition tree. As understood from the description of FIG. 4, the sequencing of services in the list may thus facilitate more efficient repair of base generation structures 146 and derived generation structures 148 by the genetic algorithm logic 150 of FIG. 1.

A repair vector, e.g. the sorted repair structure 500 as discussed with regard to FIG. 5 may be determined (604) based on the service metadata 124, device metadata 130, network metadata 132, and deployment constraints 134 of FIG. 1, the example sorted services list 400 of FIG. 4 and the example service composition hierarchy 300 of FIG. 3.

Data structures (not shown) may be initialized for storing at least chromosomes and populations for determinations of the base generation structures 146 and derived generation structures 148.

The first population, e.g., the base generation structures 146, may be determined (606), e.g., by a random process according to genetic algorithm techniques, combined with a pre-analysis, high level, application of resource constraints, additionally determining whether a requested service may already be installed on the nodes of the sensor network 102, which may be accomplished based on the sorted repair structure 500, which may be applied to all chromosomes, e.g., the base generation structures 146, e.g., using a logical AND operation. The random generation of the population may further generate invalid and incomplete solutions of the mapping problem represented, e.g., as invalid chromosomes. As understood from the description of FIG. 1, after a population is generated, the invalid chromosomes may be repaired. Further, the incompleteness of solutions represented by the chromosomes, e.g., the base generation structures 146, may be determined based on an unfitness function.

The base generation structures 146, e.g., represented as base chromosomes, with invalid combinations may be repaired (608), as understood from the description of FIG. 1. After all base generation structures 146, e.g., base chromosomes, have been repaired, they may represent valid solutions, which may satisfy resource and composition constraints. Further, as understood from the description of FIG. 1, the repair process may provide that the deployment coverage of each service to be mapped is not violated by solutions represented by the repaired base generation structures 146. However, the base generation structures 146 or chromosomes may represent incomplete solutions, for example, as deployment coverage conditions may not be satisfied.

Therefore, the unfitness of each base generation structure 146 or chromosome may be determined (610), for example, by determining the difference between a desired deployment coverage (e.g., having a value of 10) and an actual chromosome based deployment coverage (e.g., having a value of 8), thus yielding an unfitness value (e.g., a value of 2) for the respective one of the base generation structures 146 or chromosomes. As understood from the description of FIG. 1, the desired deployment coverage may be determined, e.g., by the deployment coverage logic 156 of FIG. 1.

Figure 9:
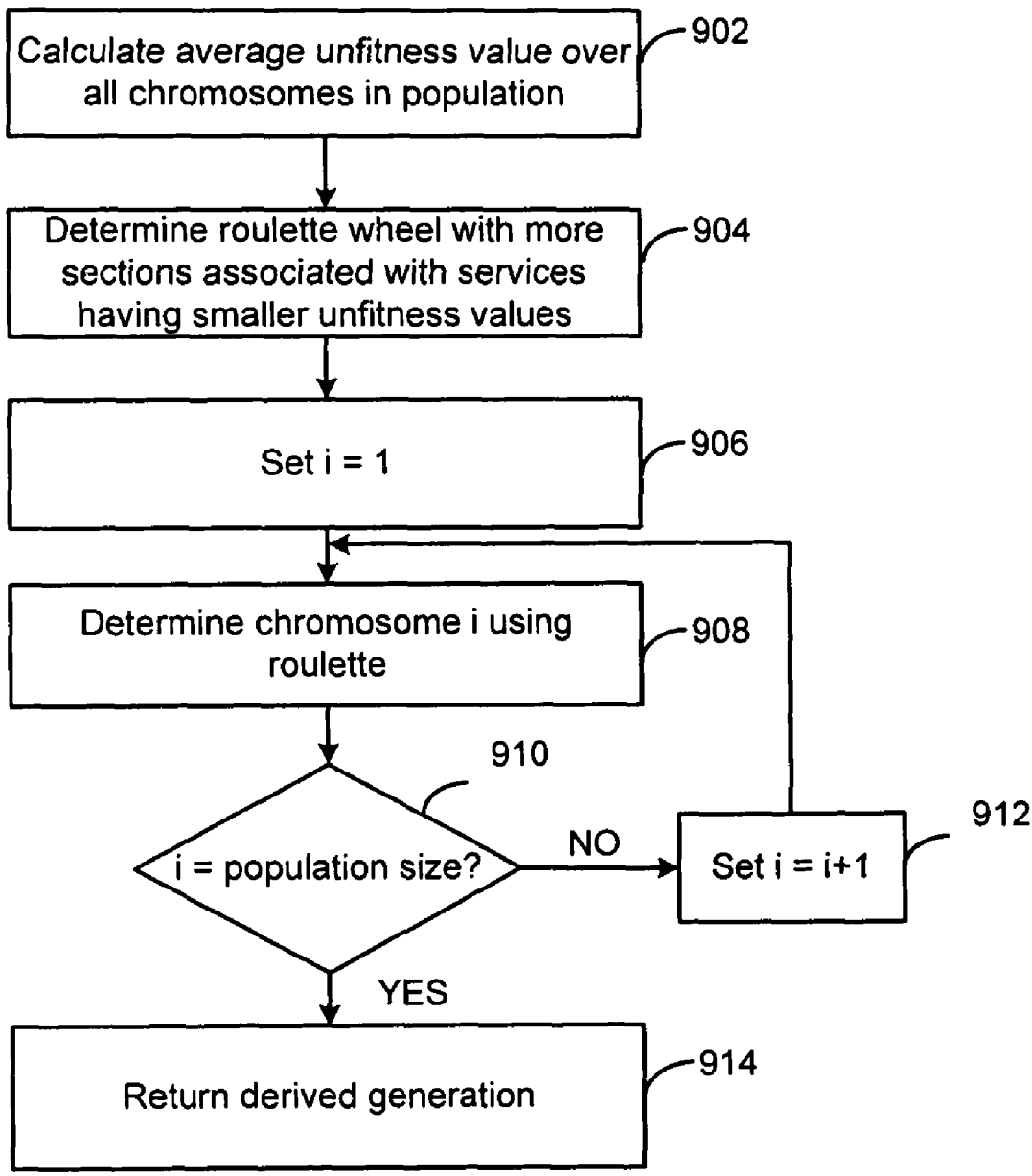
FIG. 9 is a flowchart illustrating example operations to select base generation structures for inclusion in the derived generation structures of the system of FIG. 1.

The derived generation structures 148 may be determined (612) based on a genetic algorithm selection technique which may be used to select the base generation structures 146 or chromosomes from which the next generation may be created, as discussed further with regard to FIG. 9. Chromosomes that may be determined to be "good" chromosomes, for example, chromosomes having a lower unfitness value according to an unfitness function, may be given a higher weight, and thus may be assigned a larger section of a roulette wheel selection scheme, thus leading to a higher probability that "good" chromosomes may be selected for the next generation, e.g., the derived generation structures 148. The roulette wheel analogy may correspond, for example, to a roulette wheel in which each candidate solution, or chromosome, represents a pocket on the wheel. The size of a pocket is proportionate to the probability of selection of the solution. Thus, selecting N chromosomes from a population, or generation, may be considered as equivalent to playing N games on the roulette wheel, as each candidate is drawn independently. For the example genetic algorithm that may be utilized by the genetic algorithm logic 150, the number of chromosomes in each of the base generation structures 146 and the derived generation structures 148 may be constant, although it is generally possible to vary the size of populations. Chromosomes or structures whose unfitness is smaller than an average unfitness of the population, or generation, may be ignored.

Modified derived generation structures 148 may be determined (614) based on applying genetic algorithm techniques, for example, including recombination, or crossover, techniques to the selected chromosomes. For example, two chromosomes may be selected from the population as parent chromosomes, as discussed further with regard to FIG. 9. As an example, a one point crossover technique may be used wherein a crossover point on the parent chromosome strings is selected. All data beyond that point in the chromosome string is swapped between the two parent chromosomes, and the resulting chromosomes may become the children of the parent chromosomes. As another example, a two point crossover technique may be used wherein two points are selected on the parent chromosome strings. All values between the two points are swapped between the parent chromosomes, rendering two child chromosomes.

As a further example, in accordance with a uniform crossover scheme, individual bits in chromosome strings may be compared between two parents. The bits may be swapped with a fixed probability (e.g., 0.5). As yet another example, in accordance with a half uniform crossover scheme, exactly half of the nonmatching bits may be swapped. Thus, first a Hamming distance (i.e., the number of differing bits) may be determined, for example, by applying an exclusive-OR operation on two chromosomes represented as bit strings, and adding the bits in the resulting bit string. The Hamming distance may be divided by two. The result may then indicate the number of the bits that do not match between the two parents that may be swapped.

Genetic algorithm mutation techniques may also be applied to the selected chromosomes by the genetic algorithm logic 150. For example, a mutation probability may be used to determine whether each bit in a chromosome is to be modified (e.g., set to a different value).

Each chromosome of the new population, e.g., each derived generation structure 148, may be repaired (616) based on a sorted repair structure 144, for example, by applying a logical AND function on the derived generation structure 148 and the sorted repair structure 144, and an unfitness value of each chromosome may be determined (618). For example, the unfitness value may be determined based on a fitness function, for example, based on resource requirements or on composition requirement unfitness.

The old base generation structures 146 may be replaced by the new derived generation structures 148, and steps 614-618 may be repeated until a predetermined maximum number of populations is generated. As each new generation is generated, a "best" structure or chromosome (e.g., having a smallest unfitness value) of that particular population may be stored so that when the predetermined maximum number of populations has been generated, the best chromosome, e.g., the chromosome having the smallest unfitness value may be determined resulting from all of the derived generation structures. If there are no chromosomes with an unfitness value of 0, which may represent a valid and complete solution of the mapping problem, the genetic algorithm logic 150 may be configured to attempt to complete the "best" chromosomes. Thus, an attempt may be made to install missing services on the network nodes via operations on the chromosomes, so that the deployment coverage constraints, for example, as included in the deployment constraints 134, may be satisfied. As a result, the "best" chromosome may be returned as a solution to the service mapping request.

Figure 7:
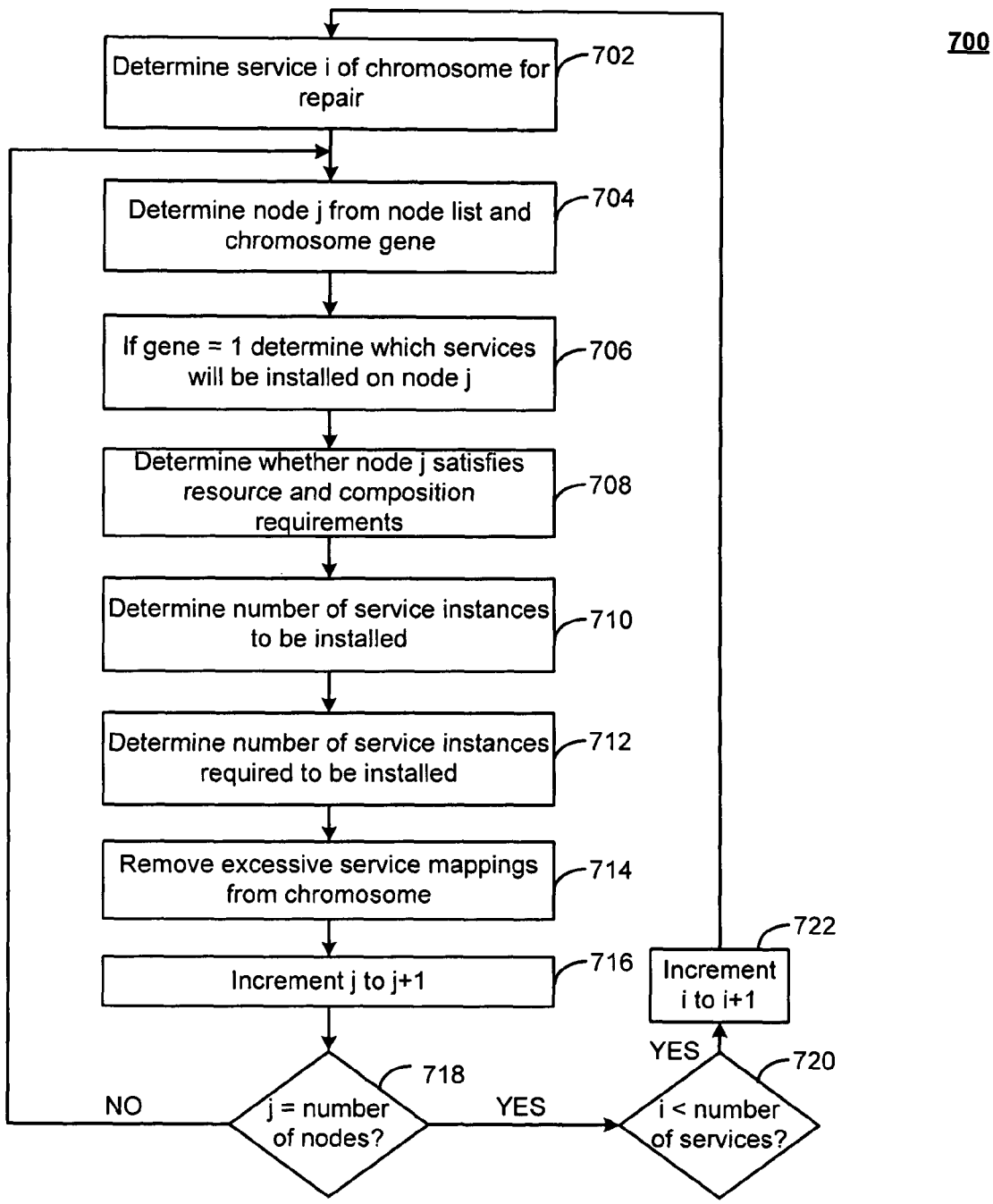
FIG. 7 is a flowchart illustrating example operations to repair base generation structures having invalid combinations of services of the system of FIG. 1.

FIG. 7 is a flowchart 700 illustrating example operations to repair base generation structures 146 having invalid combinations of services, for example, of the system 100 of FIG. 1. The chromosomes may be repaired successively for each service. As understood from the description of FIG. 1, because the services may be sorted, a repair of a service x may not influence the mapping of a service y for 1<=x<y, since service x may be repaired before service y.

After determining a chromosome, e.g., one of the base generation structures 146, for repair, and after initializing index values i and j to have values of 1, a service i of the chromosome may be determined (702) for repair analysis, and node j and a corresponding gene, or bit may be determined (704) from a node list, e.g., a node list of nodes in the network. If the gene has a value of 1, a determination may be made (706) of which services need to be installed on device, or node j, according to the chromosome values. A gene having a value of 1 may indicate that the service corresponding to the gene's position in the chromosome may need to be installed on the node corresponding to the gene's position on the chromosome. For example, a gene having a value of 1 that is located on the chromosome in a position corresponding to service D 518 and node, or device 104 may indicate that the service D 118 is to be installed on the device 104 of FIG. 1.

It may then be determined (708) whether the device, or node j satisfies resource and composition requirements for the installation of the service i on node j. For each device, or node in the network, the chromosome may be analyzed regarding the resource constraints, including determining which services are currently to be installed on which device or node, determining all resource constraints for all services which are to be installed on each device or node. If the resource constraints are not met, then services may be removed from the chromosome by setting corresponding genes to a value of zero. For each service, the chromosome may be analyzed regarding the service composition for the service, for example, by the service composition logic 154 based at least on the sorted services list 400 of FIG. 4.

For each service, sub-services may be determined, a determination may be made whether the sub-services are already installed on the device or node, and if so, the service may be installed on the device or node; if not, it may be determined whether the current chromosome indicates installation of all required sub-services on the respective device or node (where required). Since services may be sorted according their hierarchy in composition, e.g., according to the sorted services list 400 of FIG. 4, the determination may be straightforward. If it is not possible to install the sub-services, the service may be removed from the chromosome, e.g., by setting the gene corresponding to the service for the respective device or node to a value of zero. Further explanation is provided with regard to FIG. 8.

The number of service instances indicated to be installed may be determined (710), the number of service instances required to be installed may be determined (712), and the two results may be compared. If the number of service instances to be installed and the number of service instances already installed exceeds the required number, the excessive service mappings may be removed (714) from the chromosome, e.g., by setting genes corresponding to the excess service mappings to a value of zero. The index j may be incremented (716) by 1 for consideration of services for the next node or device according to the node list, until all network nodes have been considered for service i, for example, by repeating steps 704-716 until all nodes have been considered. Thus, it may then be determined whether j is equal to the number of nodes in the network (718), and if not, control returns to 704. If all services to be mapped have been considered, e.g., by determining whether the index i meets the number of services (720), then the repair may end; else the index i may be incremented by 1 (722) and steps 702-722 may be repeated until the index i indicates that all services have been analyzed for repair.

Figure 8:
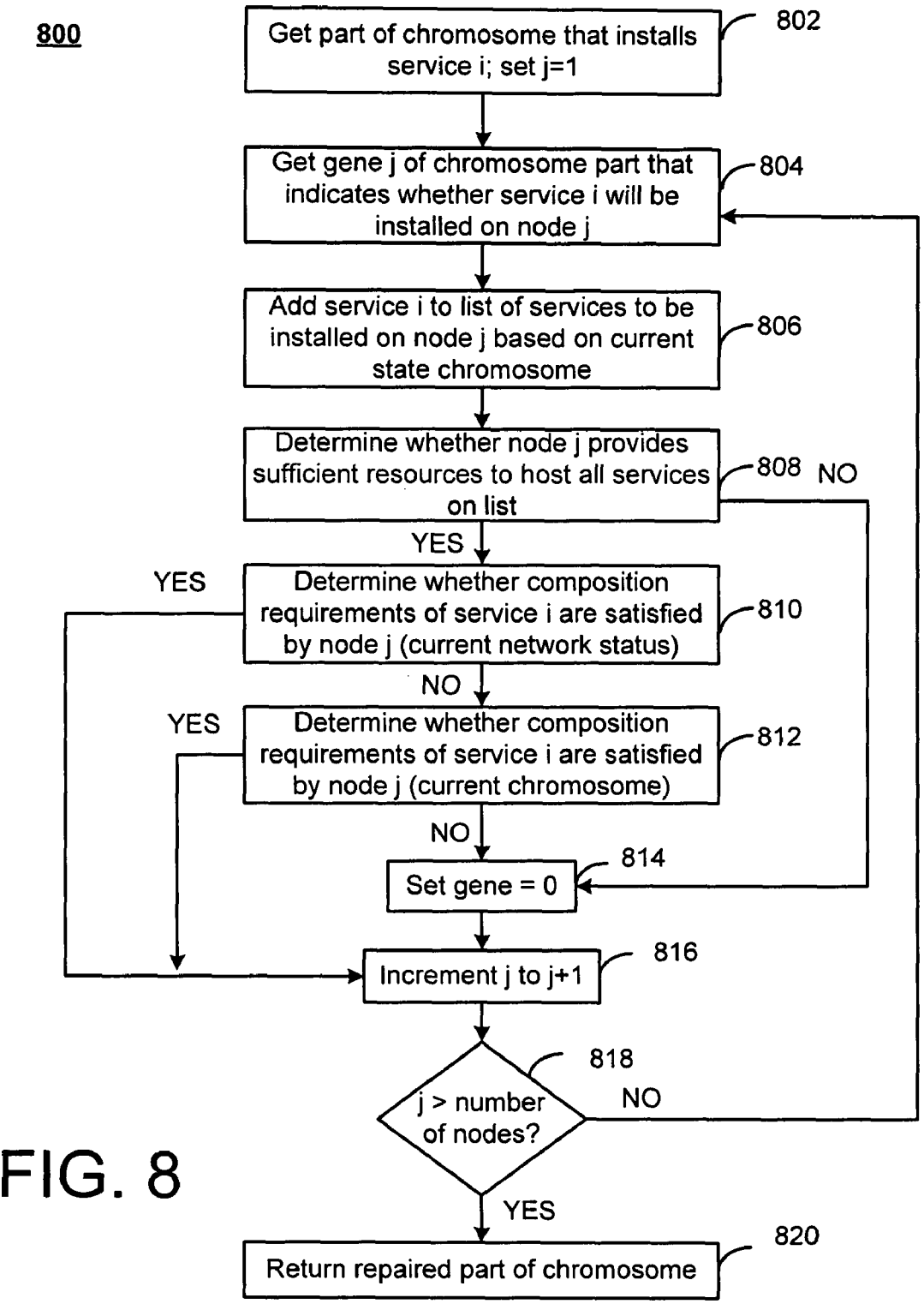
FIG. 8 is a flowchart illustrating example operations to repair base generation structures based on resources and composition of the system of FIG. 1.

FIG. 8 is a flowchart 800 illustrating example operations, for example, to repair base generation structures 146 and derived generation structures 148 based on resources and composition, for example, of the example system 100 of FIG. 1, and as further explanation of steps 708-712 of FIG. 7. It is noted that the example steps discussed herein regarding the repair of the structures involve an ordering of the services as established based, for example, on the sorted services list 400 discussed previously with regard to FIG. 4. Thus, as each service i is considered in turn for repair, it may be assumed that all services on which service i may depend, have been previously considered for repair, and thus there may be no need to reconsider all services included in a composition.

As explanation of an example repair process, a part of a chromosome that installs service i may be determined (802). Index j may be set to a value of 1. Thus, a gene j of the chromosome part that indicates whether service i is to be installed on device or node j may be determined (804). The service i may be added to a list of services to be installed on node j based on the current chromosome (806). It may then be determined (808) whether node j provides sufficient resources to host all resources on the list of services to be installed on node j. This determination may be performed, for example, by the resource requirement logic 152 based at least on the service metadata 124 and the network metadata 132. Additionally, the determination may be based on the deployment constraints 134 or the allowable deployment condition 142.

If it is determined (808) that node j does not provide sufficient resources to host all resources on the list of services to be installed on node j, the corresponding gene may be set to a value of zero (814), the index j may be incremented by a value of 1 (816), and control may pass to step 804 if j does not exceed the size of the network (818); else the repaired part of the chromosome may be returned (820). If node j provides sufficient resources (808), then it may be determined (810) whether the composition requirements of service i are satisfied by node j based on a current network status. This determination may be performed, for example, by the service composition logic 154 based at least on the sorted services list 400, the sorted repair structure 500, the service metadata 124 and the network metadata 132. Additionally, the determination may be based on the deployment constraints 134 or the allowable deployment condition 142.

If it is determined (810) that the composition requirements of service i are satisfied by node j based on a current network status, the index j may be incremented by 1 (816), and control may pass to step 804 if j does not exceed the size of the network (818); else the repaired part of the chromosome may be returned (820). If it is determined (810) that the composition requirements of service i are not satisfied by node j based on a current network status, it may be determined (812) whether the composition requirements of service i are satisfied by node j based on a current chromosome status. If it is determined (812) that the composition requirements of service i are not satisfied by node j based on the current chromosome status, the corresponding gene may be set to a value of zero (814), the index j may be incremented by a value of 1 (816), and control may pass to step 804 if j does not exceed the size of the network (818); else the repaired part of the chromosome may be returned (820).

If it is determined (812) that the composition requirements of service i are satisfied by node j based on the current chromosome status, the index j may be incremented by 1 (816), and control may pass to step 804 if j does not exceed the size of the network (818); else the repaired part of the chromosome may be returned (820). The repair technique may ensure that the deployment coverage is not exceeded (for each service), for example, via the deployment coverage logic 156. For example, if there are too many instances of a particular service for a chromosome, the service instances may be removed from the chromosome, for example, by setting the corresponding genes of the chromosome to a value of 0.

These genes may be selected randomly, or they may, for example, be selected in accordance with a priority of services for removal.

FIG. 9 is a flowchart 900 illustrating example operations to select base generation structures 146 for inclusion in the derived generation structures 148 of the system 100 of FIG. 1, as discussed with regard to step 614 of FIG. 6. An average unfitness value may be determined (902) based on unfitness values determined for all chromosomes in the base population, e.g., the base generation structures 146. For example, the unfitness values of each chromosome, or structure in the base generation structures 146 may be added together, and the resulting sum may be divided by the total number of chromosomes or structures in the population, to determine the average unfitness value. As noted previously, chromosomes having smaller unfitness values may indicate better solutions to the mapping problem, e.g., better mappings for the requested services.

A roulette wheel may be determined (904) such that services associated with smaller unfitness values may be associated with more sections of the roulette wheel than other services. Thus, the better chromosomes may have a higher probability of being selected for participation in the next generation, for example, the next derived generation structures 148. Index i may be set to a value of 1 (906). A chromosome i may be determined based on roulette (908). If i is equal to a predetermined size of the derived population (910), e.g., the number of structures in the derived generation structures 148, then the derived population is returned (914) as the new derived generation, e.g., the derived generation structures 148; if not, the index i is incremented (912) by a value of 1 and control returns to step 908. As discussed previously, the genetic algorithm techniques of crossover or recombination and mutation may be applied to resulting chromosomes.

It is also possible to generate an optimal or sub-optimal solution of the mapping problem. In order to generate such a solution, the fitness of each chromosome with regard to pre-defined goals may be determined. When processing is complete, a most feasible solution, which may have a smallest unfitness value and a largest fitness value, is returned.

As described herein, service-to-device mapping algorithms based on genetic algorithm techniques enable the automatic intelligent mapping of services to appropriate devices, e.g., smart item devices, so that the services may thereafter be deployed thereto. The genetic algorithm techniques use constraint information in determining initial populations and derived populations and consider composite services information in determining the populations based on a sorted repair structure. Accordingly, a desired service deployment may be obtained in an easy, reliable manner, and a functionality of the sensor network may be made more flexible and more predictable. Techniques described herein are not limited to service-to-device mapping, and may be used for other applications, e.g., in grid computing.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:

determining, using a processor, a sorted repair structure indicating an ordering of services in accordance with a hierarchy of atomic services and composite services based on a composition of services for one or more devices of a sensor network;

determining, using the processor, one or more derived generation structures based on genetic algorithm logic that is operable on the sorted repair structure, wherein the genetic algorithm logic is configured to provide a derived generation chromosome based on performing one or more of a selection operation, a crossover operation, a mutation operation, and a repair operation on a chromosome of a base generation structure, and based on one or more of the sorted repair structures; and mapping, using the processor, a service onto at least one device of the sensor network, based on one of the derived generation structures, wherein determining the sorted repair structure comprises:

determining, using the processor, a repair vector indicating requested services for mapping onto the one or more devices of the sensor network and deployment constraints indicating constraints associated with installing each of the requested services on one or more of the devices, the repair vector sorted based on the ordering of services in accordance with the hierarchy of atomic services and composite services corresponding to the requested services.

2. The method of claim 1 wherein determining the sorted repair structure comprises:

determining, using the processor, a request list indicating requested services for mapping onto the one or more devices of the sensor network; and determining, using the processor, a sorted request list indicating the requested services based on the request list, sorted based on the ordering of services in accordance with the hierarchy of atomic services and composite services corresponding to the requested services.

3. The method of claim 1 wherein each of the composite services comprises a composition of two or more of the requested services and wherein a first one of the requested services of the composition depends on an installation of a second one of the requested services of the composition installed on at least one device of the sensor network.

4. The method of claim 3 wherein the ordering of services in accordance with the hierarchy of atomic services and composite services corresponding to the requested services includes ordering each of the atomic services in an order preceding all composite services that depend on the each atomic service in a hierarchical ordering of the corresponding requested services.

5. The method of claim 1 wherein determining one or more derived generation structures based on genetic algorithm logic that is operable on the sorted repair structure comprises:

determining, using the processor, one or more base generation structures, based on the sorted repair structure;

modifying, using the processor, the base generation structures based on resource constraint logic operable on service metadata; and determining, using the processor, one of the derived generation structures based on the modified base generation structures.

6. The method of claim 5 wherein modifying the base generation structures comprises:

determining, using the processor, whether the base generation structures include one or more installation indicators indicating installation of requested services onto the one or more devices of the sensor network, the installation indicators sorted based on the ordering of services in accordance with the hierarchy of atomic services and composite services corresponding to the requested services.

7. The method of claim 5 wherein modifying the base generation structure comprises:

determining, using the processor, whether a deployment constraint is violated based on a statistical analysis of system metadata.

8. The method of claim 5 wherein modifying the base generation structure comprises:

selecting, using the processor, two or more of the base generation structures as parent chromosomes based on a roulette operation; and determining, using the processor, at least one child chromosome based on performing a crossover operation on the two or more parent chromosomes by the genetic algorithm logic.

9. The method of claim 5 wherein modifying the base generation structure comprises:

selecting, using the processor, one of the base generation structures as a selected chromosome; and determining, using the processor, a mutated chromosome based on performing a mutation operation on the selected chromosome by the genetic algorithm logic.

10. A computer-implemented system comprising computer-executable code recorded on a non-transitory computer-readable medium comprising:

a network monitor configured via the computer-executable code to monitor a plurality of devices of a sensor network, and configured to determine device metadata associated with at least one of the plurality of devices; and a service mapper configured via the computer-executable code to determine a base generation structure, based on one or more sorted repair structures indicating an ordering of services in accordance with a hierarchy of atomic services and composite services based on a composition of services associated with the devices, based on the device metadata, and based on service metadata associated with the service, and configured to map a service onto the at least one device based on a derived generation structure that is based on genetic algorithm logic operable on the base generation structure, wherein:

the sorted repair structure comprises a repair vector indicating requested services for mapping onto the one or more devices of the sensor network and deployment constraints indicating constraints associated with installing each of the requested services on one or more of the devices, the repair vector sorted based on the ordering of services in accordance with the hierarchy of atomic services and composite services corresponding to the requested services, and the genetic algorithm logic is configured to provide a derived generation chromosome based on performing one or more of a selection operation, a crossover operation, a mutation operation, and a repair operation on a chromosome of the base generation structure, and based on the sorted repair structure.

11. The computer-implemented system of claim 10 wherein the service mapper comprises:

a mapping system comprising:

the sorted repair structures;

the base generation structure; and the derived generation structure; and genetic algorithm logic configured to determine the sorted repair structure based on the composition of services.

12. The computer-implemented system of claim 10 wherein each of the composite services comprises a composition of two or more requested services that are requested for installation on at least one of the devices of the sensor network, and wherein a first one of the requested services of the composition depends on an installation of a second one of the requested services of the composition installed on at least one device of the sensor network.

13. The computer-implemented system of claim 10 wherein the ordering of services in accordance with the hierarchy of atomic services and composite services includes ordering each of the atomic services in an order preceding all composite services that depend on the each atomic service in a hierarchical ordering of the atomic services and composite services.

14. The computer-implemented system of claim 10 wherein the base generation structure comprises a chromosome indicating one or more installation states of one or more services on one or more of the devices.

15. The computer-implemented system of claim 14 wherein the chromosome includes a plurality of ordered indicators indicating the one or more installation states, sorted based on the ordering of services in accordance with the hierarchy of atomic services and composite services.

16. A non-transitory recordable storage medium having recorded and stored thereon instructions that, when executed by a processor, perform the action of using genetic algorithm logic to provide one or more derived generation structures based on service composition logic that is operable on one or more sorted repair structures indicating an ordering of service in accordance with a hierarchy of atomic services and composite services; and mapping a service onto at least one device of the sensor network, based on one of the derived generation structures; wherein: the sorted repair structure comprises a repair vector indicating requested services for mapping onto the one or more devices of the sensor network and deployment constraints indicating constraints associated with installing each of the requested services on one or more of the devices, the repair vector sorted based on the ordering of services in accordance with the hierarchy of atomic services and composite services corresponding to the requested services, and the genetic algorithm logic is configured to provide a derived generation chromosome based on performing one or more of a selection operation, a crossover operation, a mutation operation, and a repair operation on a chromosome of the base generation structure, and based on one or more of the sorted repair structures.

* * * * *